US011932001B2

(12) United States Patent
Song et al.

(10) Patent No.: US 11,932,001 B2
(45) Date of Patent: Mar. 19, 2024

(54) DECORATION MEMBER

(71) Applicant: LG CHEM, LTD., Seoul (KR)

(72) Inventors: Jin Suk Song, Daejeon (KR); Jungdoo Kim, Daejeon (KR); Sangcholl Han, Daejeon (KR); Song Ho Jang, Daejeon (KR); Ki Hwan Kim, Daejeon (KR); Pilsung Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 805 days.

(21) Appl. No.: 16/981,110

(22) PCT Filed: Jun. 17, 2019

(86) PCT No.: PCT/KR2019/007281
§ 371 (c)(1),
(2) Date: Sep. 15, 2020

(87) PCT Pub. No.: WO2019/240561
PCT Pub. Date: Dec. 19, 2019

(65) Prior Publication Data
US 2021/0333451 A1    Oct. 28, 2021

(30) Foreign Application Priority Data

Jun. 15, 2018   (KR) .................. 10-2018-0069234
Oct. 4, 2018    (KR) .................. 10-2018-0118369
Apr. 5, 2019    (KR) .................. 10-2019-0040237

(51) Int. Cl.
B32B 7/023    (2019.01)
A45C 11/00    (2006.01)
(Continued)

(52) U.S. Cl.
CPC .............. *B32B 7/023* (2019.01); *A45C 11/00* (2013.01); *A45D 33/18* (2013.01); *A45D 34/00* (2013.01);
(Continued)

(58) Field of Classification Search
CPC ........ A45C 11/00; A45D 33/18; A45D 34/00; B32B 7/023; B32B 15/00; B32B 15/04; B32B 15/08; B32B 15/082; B32B 15/085; B32B 15/088; B32B 15/09; B32B 15/092; B32B 15/095; B32B 15/098; C01G 3/00; C01G 3/02; C01G 5/00; C01G 7/00; C01G 23/00; C01G 23/04; C01G 23/043;
(Continued)

(56) References Cited

U.S. PATENT DOCUMENTS 6,157,489 A    12/2000   Bradley, Jr. et al.
6,236,510 B1    5/2001   Bradley, Jr. et al.
(Continued)

FOREIGN PATENT DOCUMENTS

CN    1345274 A    4/2002
CN    1630587 A    6/2005
(Continued)

*Primary Examiner* — Zachary M Davis
(74) *Attorney, Agent, or Firm* — BRYAN CAVE LEIGHTON PAISNER LLP (DC)

(57) ABSTRACT

This specification relates to a decoration member including: a substrate; and a decoration layer provided on the substrate in which there are one or more combinations of viewing angles θ and φ in which a contrast parameter $C_n$ represented by Equation 1 is 0.1 or more.

17 Claims, 29 Drawing Sheets

(51) Int. Cl.
*A45D 33/18* (2006.01)
*A45D 34/00* (2006.01)
*G02B 5/18* (2006.01)

(52) U.S. Cl.
CPC ...... *G02B 5/1842* (2013.01); *A45D 2034/007* (2013.01); *B32B 2307/416* (2013.01); *B32B 2451/00* (2013.01)

(58) Field of Classification Search
CPC ...... C01G 23/047; C01G 31/00; C01G 31/02; C01G 35/00; C01G 37/00; C01G 37/006; C01G 37/02; C01G 39/00; C01G 39/006; C01G 51/00; C01G 51/006; C01G 51/04; C01G 53/00; C01G 53/006; C01G 53/04; C23C 14/0015; G02B 5/1842
See application file for complete search history.

(56) References Cited

U.S. PATENT DOCUMENTS

| | | | |
|---|---|---|---|
| 6,602,578 | B1 | 8/2003 | Tompkin et al. |
| 6,686,042 | B1 | 2/2004 | LeGallee |
| 6,797,366 | B2 | 9/2004 | Hanson et al. |
| 8,287,994 | B2 | 10/2012 | Fukawa et al. |
| 9,880,332 | B2 | 1/2018 | Krishnan et al. |
| 9,903,989 | B2 | 2/2018 | Kim et al. |
| 2004/0013805 | A1 | 1/2004 | Nagata et al. |
| 2005/0063067 | A1 | 3/2005 | Phillips et al. |
| 2005/0127663 | A1 | 6/2005 | Heim |
| 2008/0206495 | A1 | 8/2008 | Korechika et al. |
| 2010/0128204 | A1 | 5/2010 | Omote et al. |
| 2011/0177300 | A1 | 7/2011 | Hankey et al. |
| 2011/0273356 | A1 | 11/2011 | Kawaguchi et al. |
| 2012/0064310 | A1 | 3/2012 | Kawai et al. |
| 2013/0251947 | A1 | 9/2013 | Lazarev |
| 2015/0192897 | A1 | 7/2015 | Schilling et al. |
| 2015/0212244 | A1 | 7/2015 | Kim et al. |
| 2016/0052227 | A1 | 2/2016 | Takihara et al. |
| 2017/0052295 | A1 | 2/2017 | Sakuma et al. |
| 2017/0307795 | A1 | 10/2017 | Hankey et al. |
| 2018/0033893 | A1 | 2/2018 | Lee et al. |
| 2018/0046017 | A1 | 2/2018 | Lee et al. |
| 2018/0267638 | A1 | 9/2018 | Yoon et al. |
| 2019/0161847 | A1 | 5/2019 | Ready et al. |
| 2019/0302317 | A1 | 10/2019 | Jones et al. |
| 2020/0062027 | A1 | 2/2020 | Shon et al. |
| 2020/0114621 | A1 | 4/2020 | Kim et al. |
| 2021/0016540 | A1 | 1/2021 | Jo et al. |

FOREIGN PATENT DOCUMENTS

| | | |
|---|---|---|
| CN | 101249773 A | 8/2008 |
| CN | 102725663 A | 10/2012 |
| CN | 202518003 U | 11/2012 |
| CN | 104245884 A | 12/2014 |
| CN | 104602909 A | 5/2015 |
| CN | 104903117 A | 9/2015 |
| CN | 107112075 A | 8/2017 |
| CN | 107521251 A | 12/2017 |
| CN | 111683562 A | 9/2020 |
| DE | 102016007649 A1 | 12/2017 |
| EP | 2420391 A2 | 2/2012 |
| EP | 3725516 A1 | 10/2020 |
| GB | 1 234 079 A | 3/1971 |
| JP | H03-254943 A | 11/1991 |
| JP | 2002-530712 A | 9/2002 |
| JP | 2005-516829 A | 6/2005 |
| JP | 2008-238599 A | 10/2008 |
| JP | 2008229997 A | 10/2008 |
| JP | 4304001 B2 | 7/2009 |
| JP | 2009168928 A | 7/2009 |
| JP | 2010-173273 A | 8/2010 |
| JP | 2010188713 A | 9/2010 |
| JP | 2011-005682 A | 1/2011 |
| JP | 2011140136 A | 7/2011 |
| JP | 2011173379 A | 9/2011 |
| JP | 2013-515285 A | 5/2013 |
| JP | 2015-068849 A | 4/2015 |
| JP | 2016218913 A | 12/2016 |
| JP | 2017502320 A | 1/2017 |
| JP | 2017159650 A | 9/2017 |
| JP | 2017-205959 A | 11/2017 |
| KR | 10-20100135837 A | 12/2010 |
| KR | 10-20120047845 A | 5/2012 |
| KR | 10-1512236 B1 | 3/2014 |
| KR | 10-2016-0085132 A | 7/2016 |
| KR | 10-20170063510 A | 6/2017 |
| KR | 1020170133109 A | 12/2017 |
| TW | 201022051 A | 6/2010 |
| TW | 201600901 A | 1/2016 |
| WO | 0031571 A1 | 6/2000 |
| WO | 2000/043565 A1 | 7/2000 |
| WO | 2002/024818 A1 | 3/2002 |
| WO | 2009008403 A1 | 1/2009 |
| WO | 2016159602 A1 | 6/2016 |
| WO | 2016137282 A1 | 9/2016 |
| WO | 2017214007 A1 | 12/2017 |
| WO | 2018/030355 A1 | 2/2018 |
| WO | 2018-164464 A1 | 9/2018 |
| WO | 2019004722 A1 | 1/2019 |

[Figure 1]
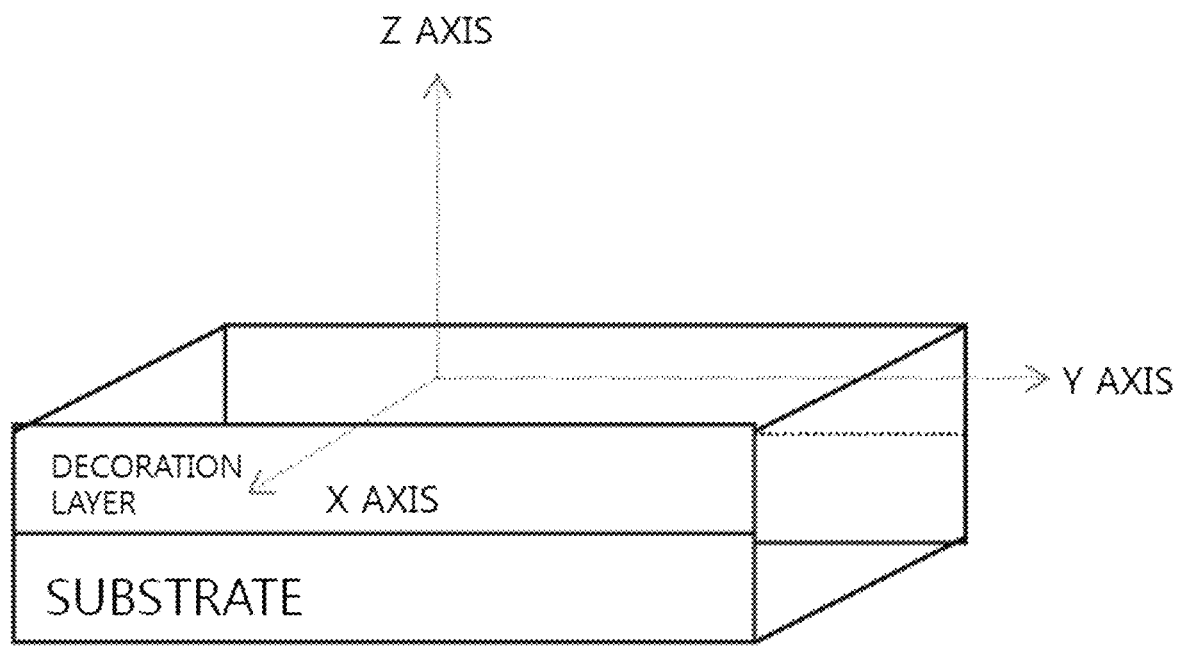

[Figure 2]
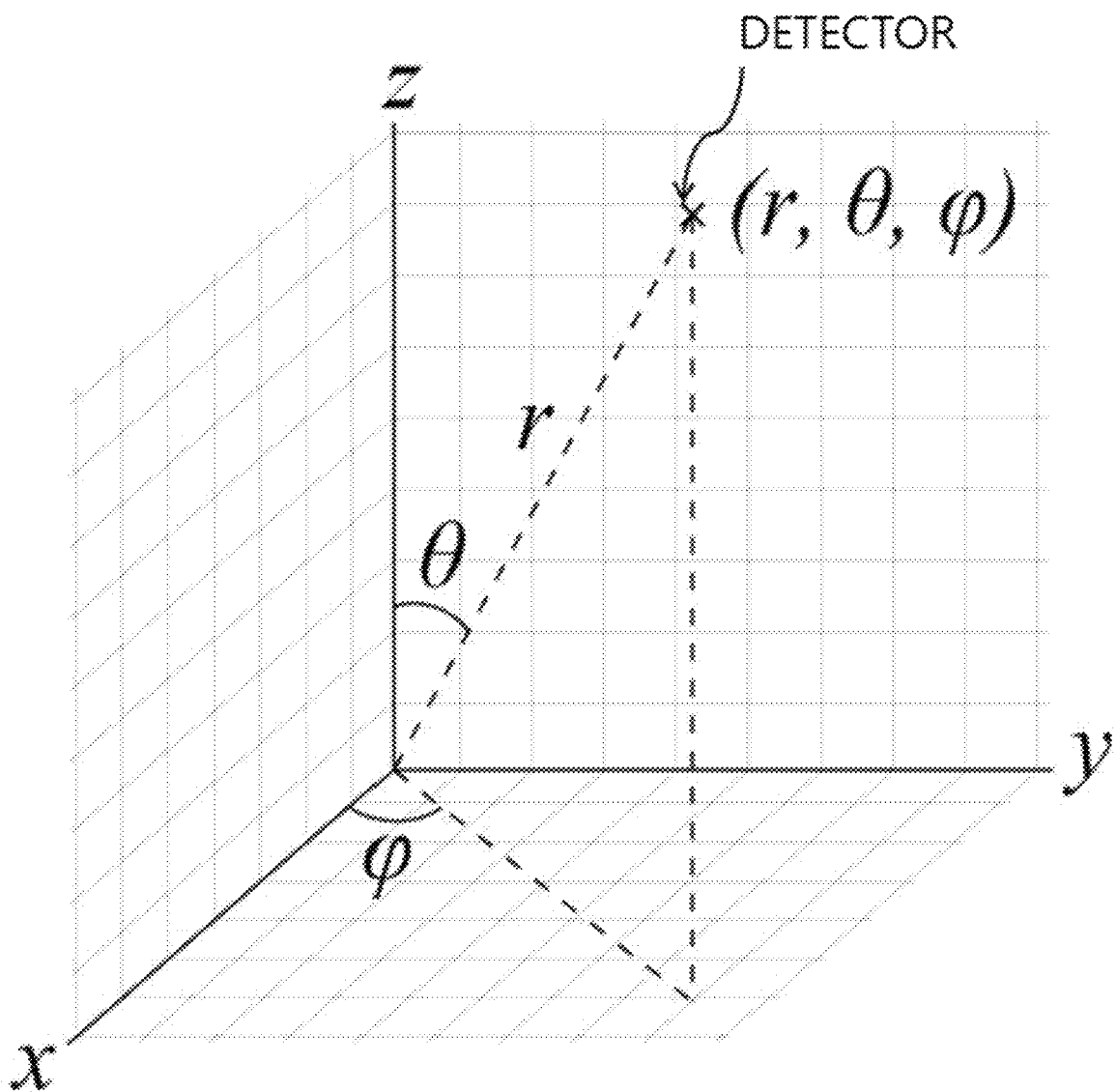

[Figure 3]
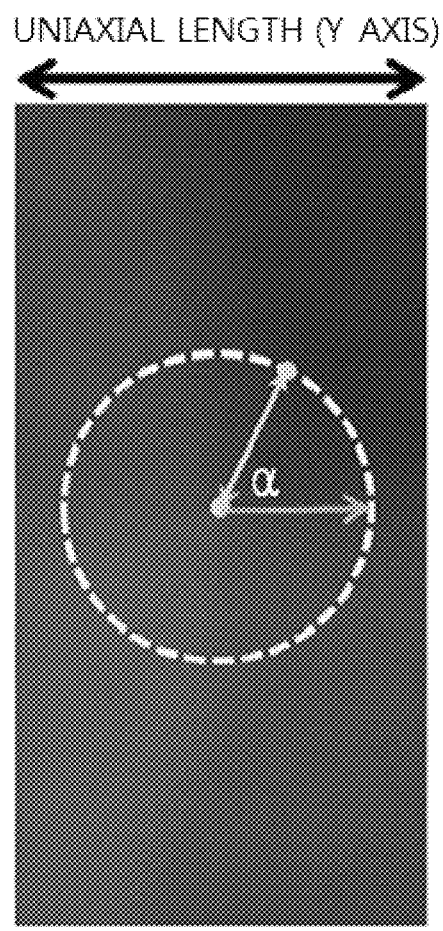

[Figure 4]
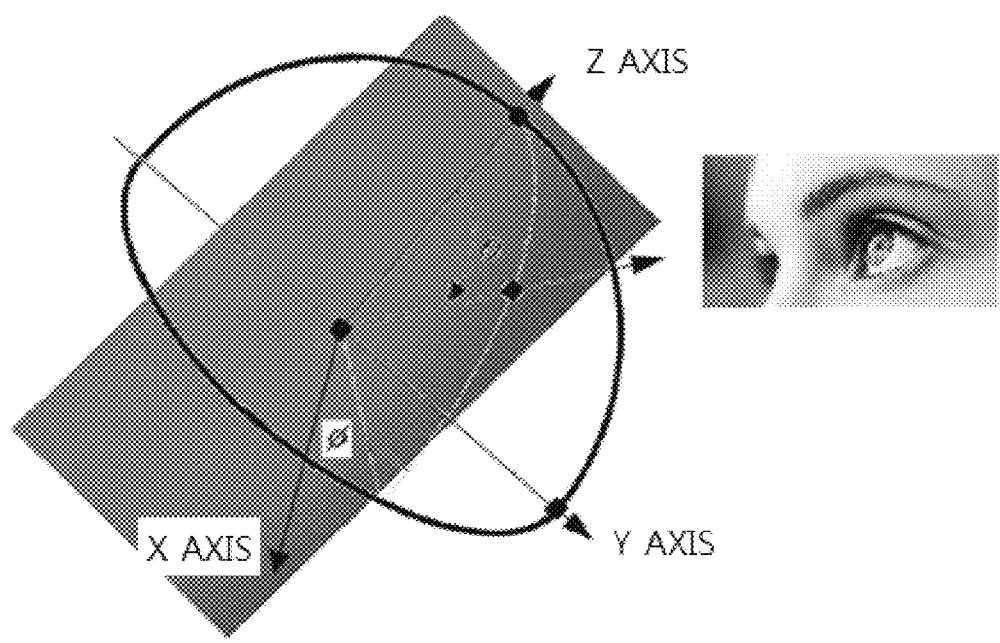

[Figure 5]
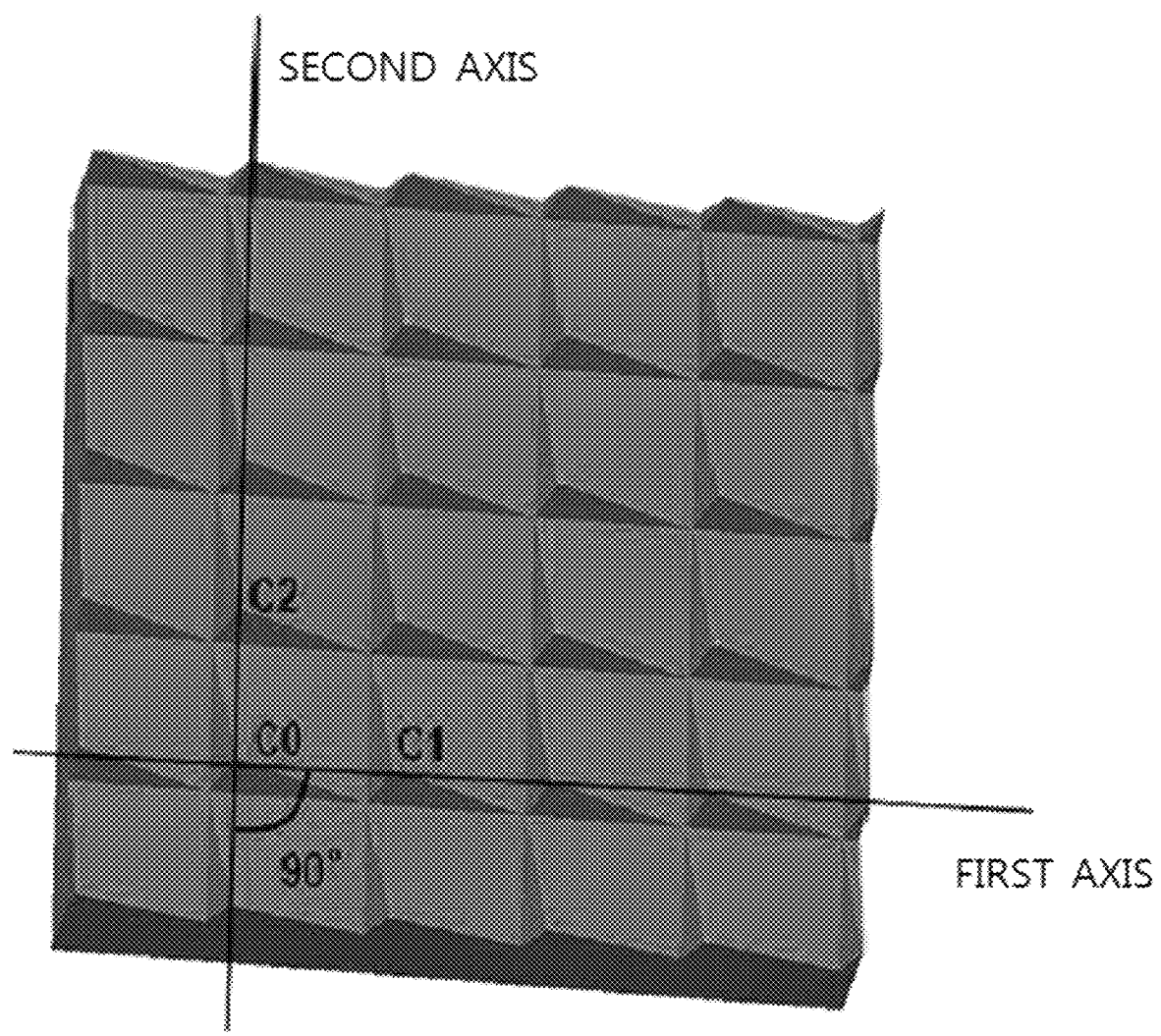

[Figure 6]
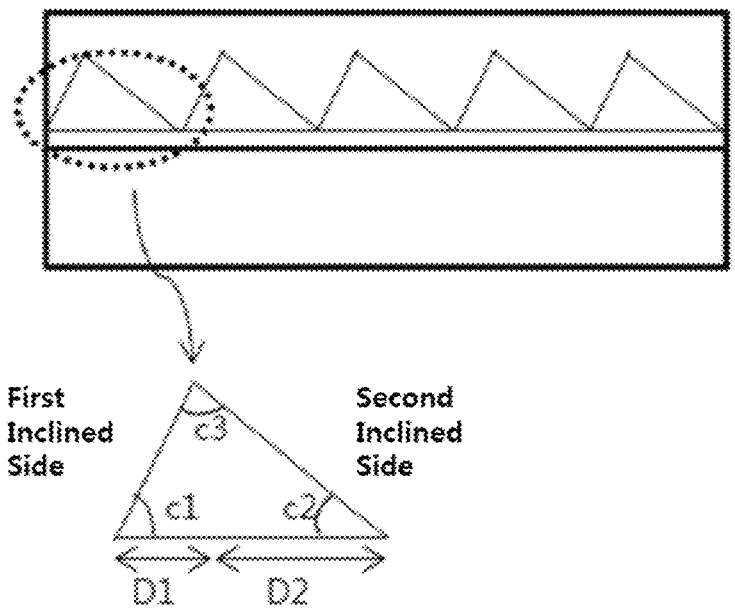
[Figure 7]
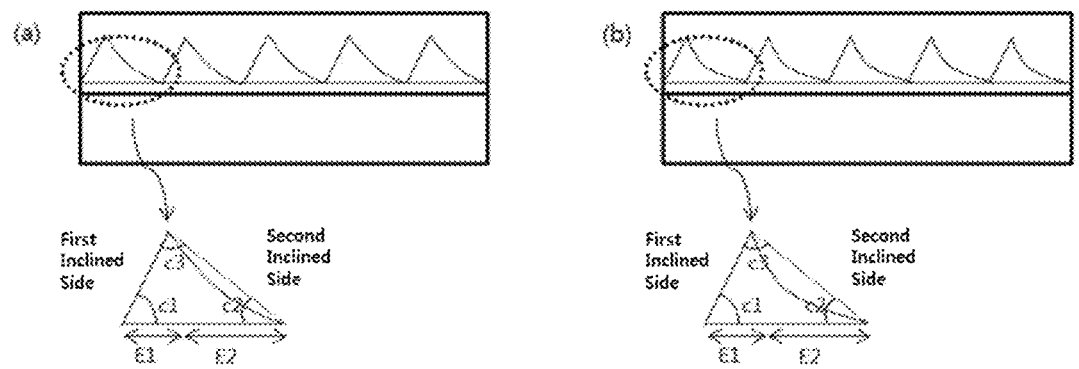

[Figure 8]
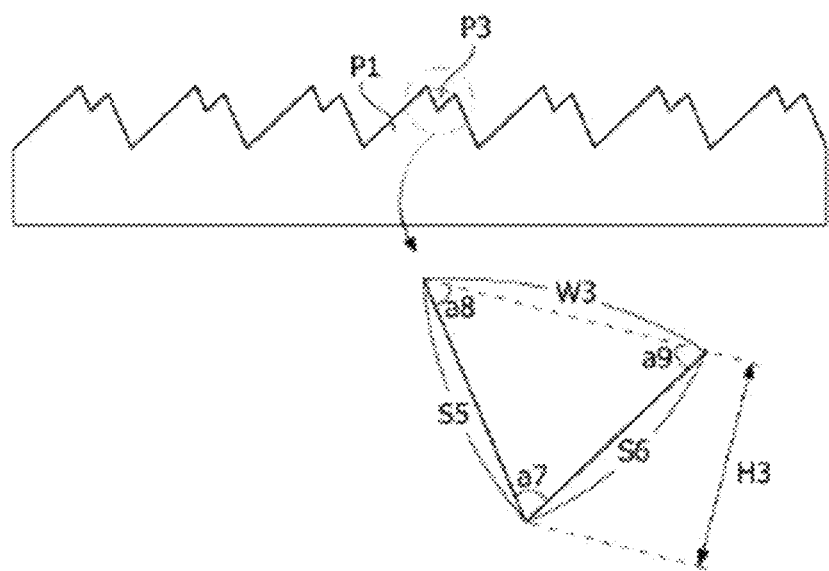

[Figure 9]
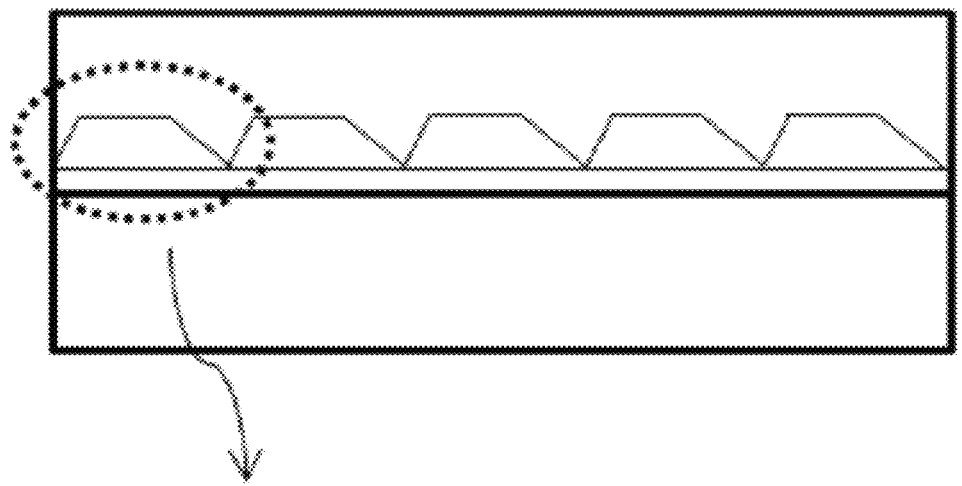
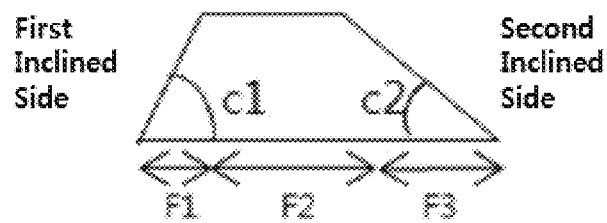
[Figure 10]
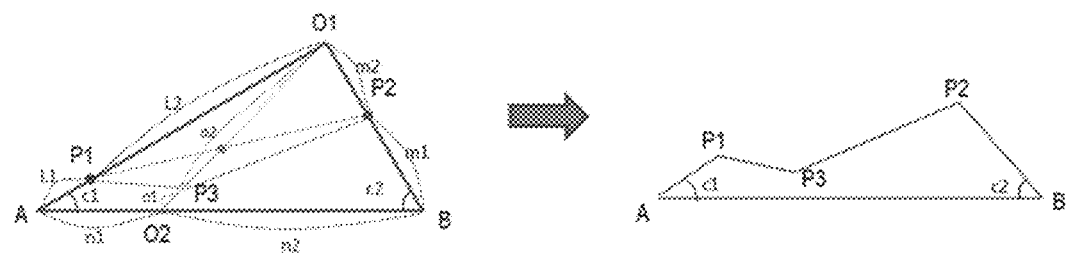

[Figure 11]

[Figure 12]
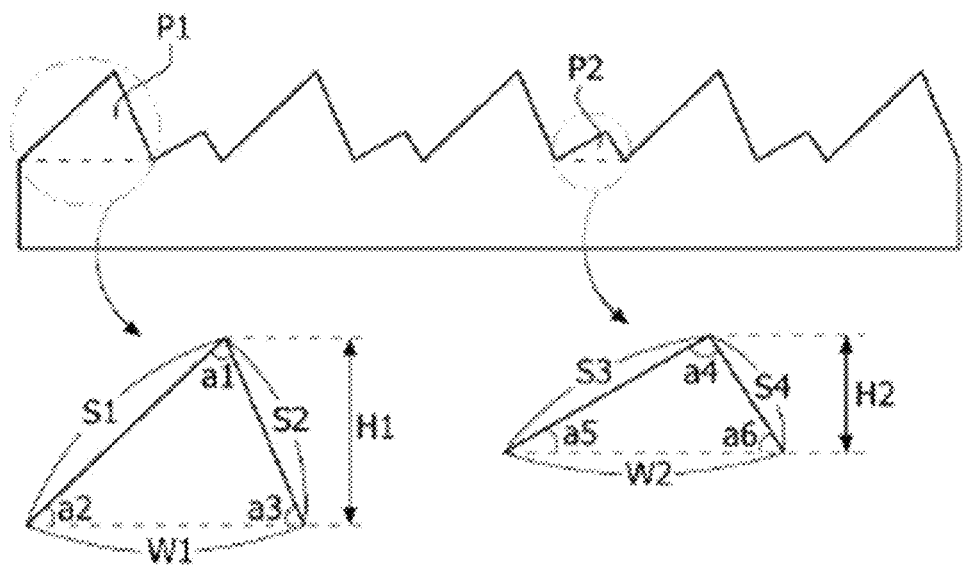

[Figure 13]
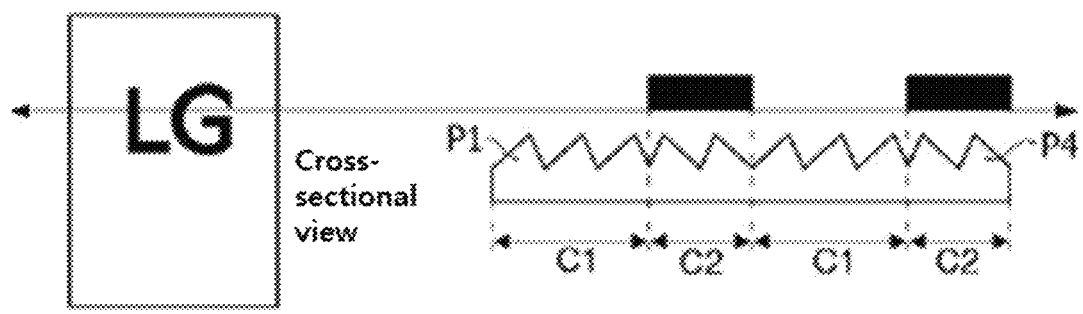
(a)
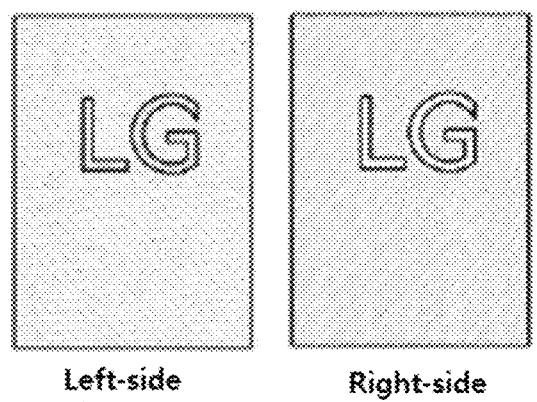
(b)
[Figure 14]
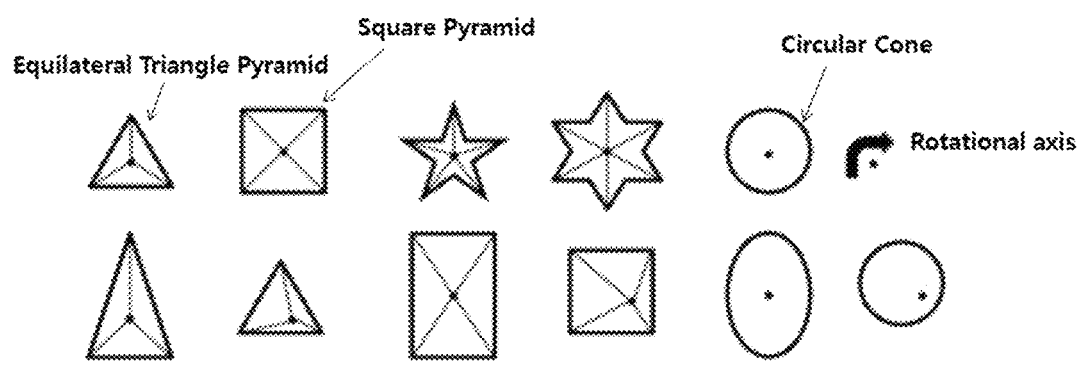

[Figure 15]
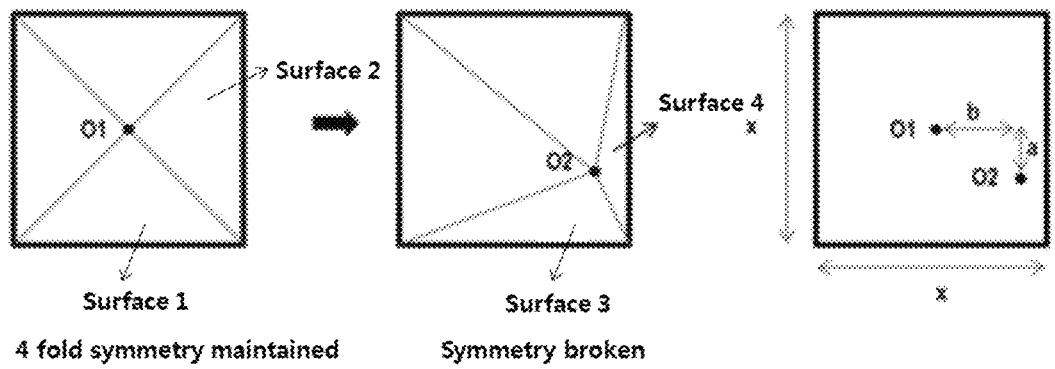
Surface 1 — 4 fold symmetry maintained
Surface 3 — Symmetry broken
[Figure 16]
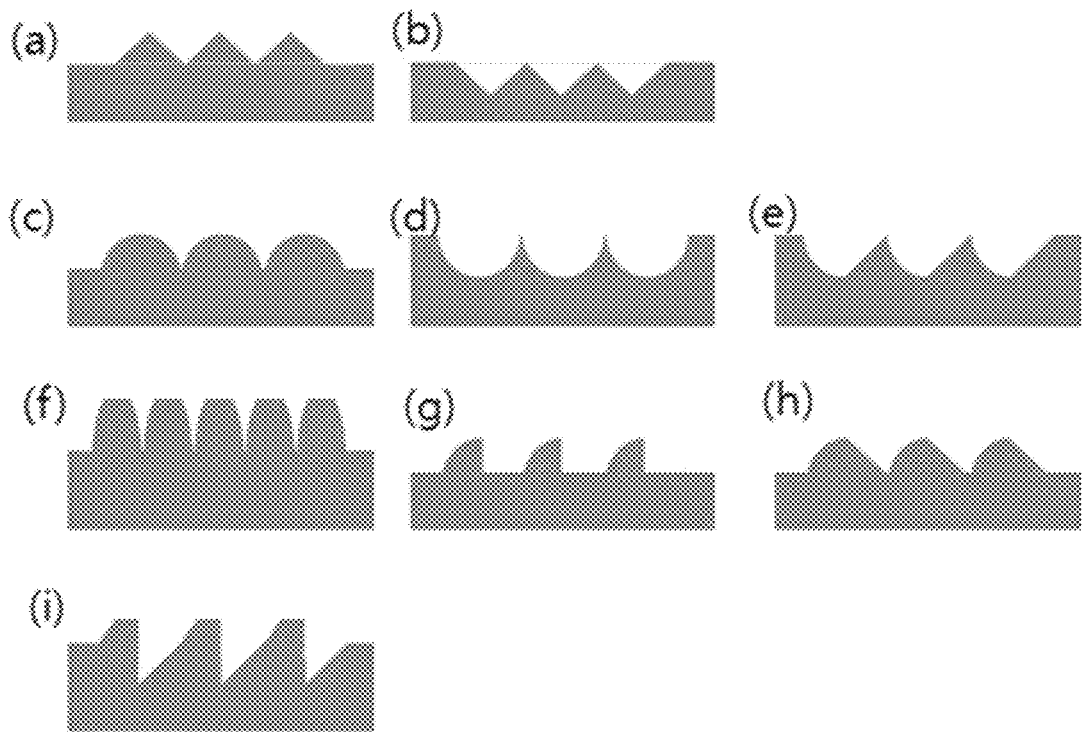

[Figure 17]
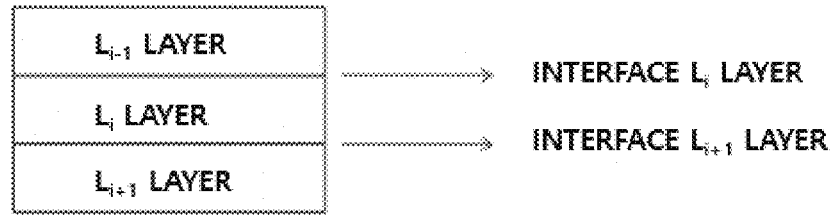
[Figure 18]
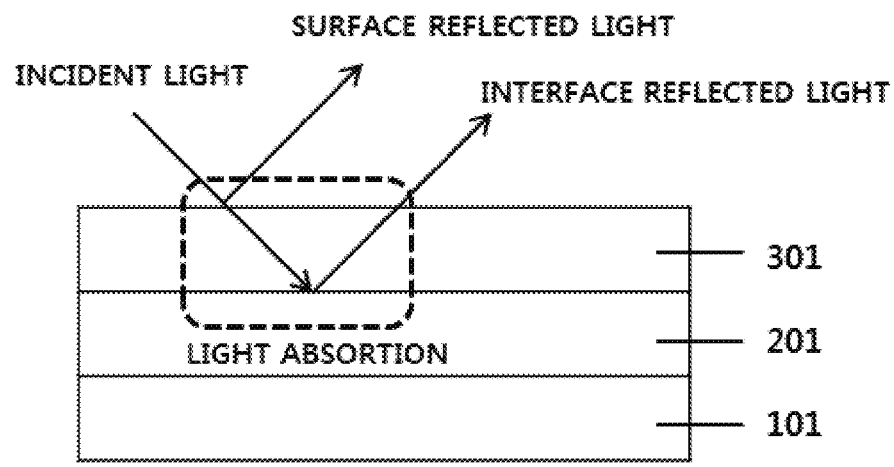
[Figure 19]
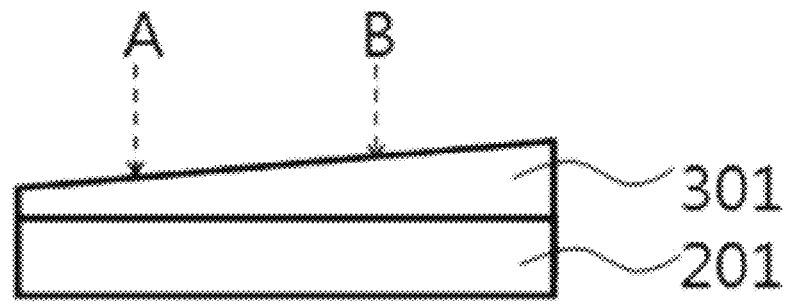

[Figure 20]
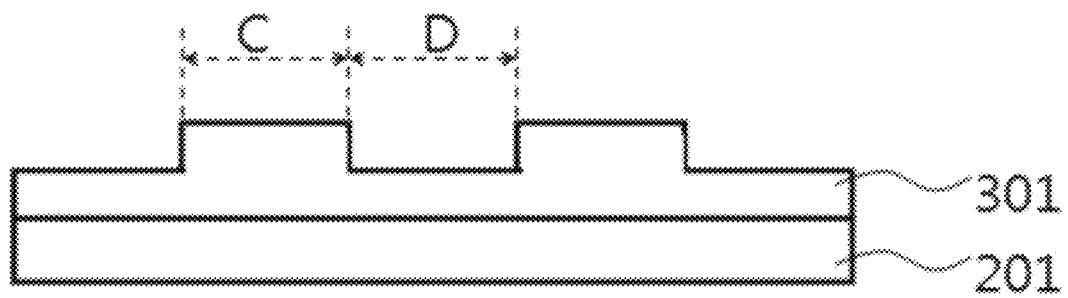

[Figure 21]
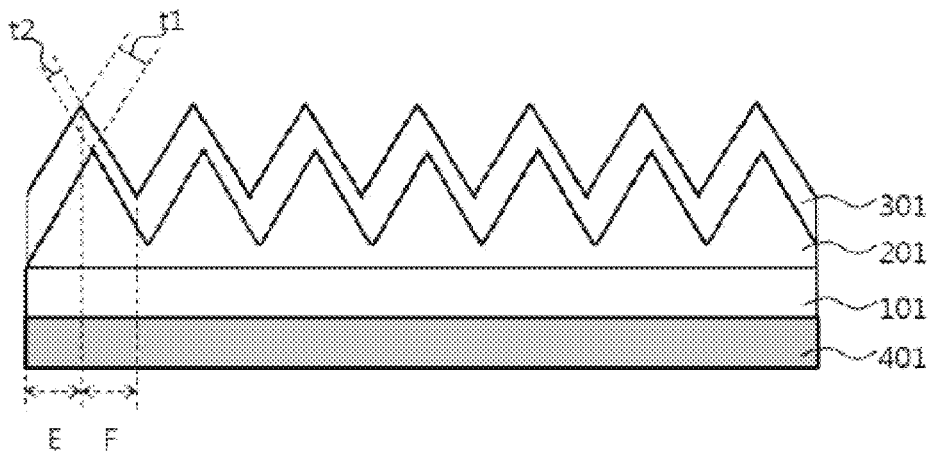
[Figure 22]
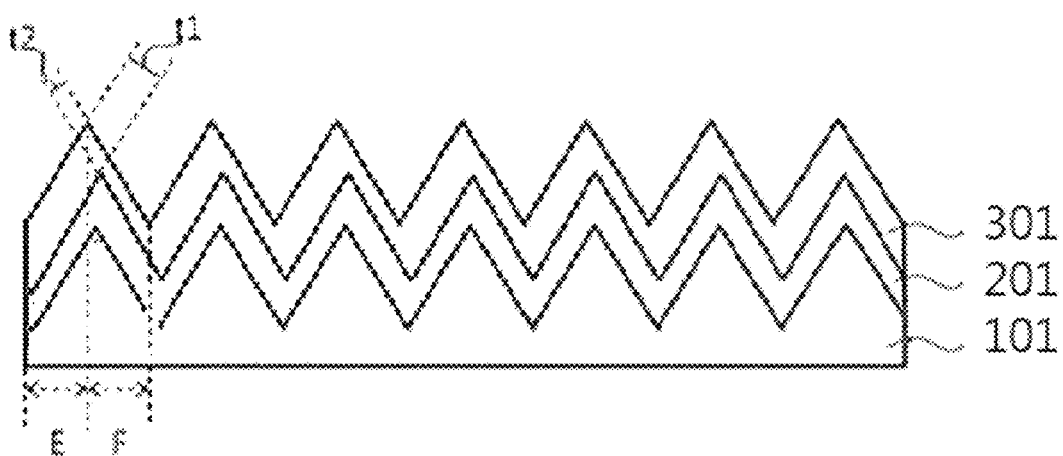
[Figure 23]
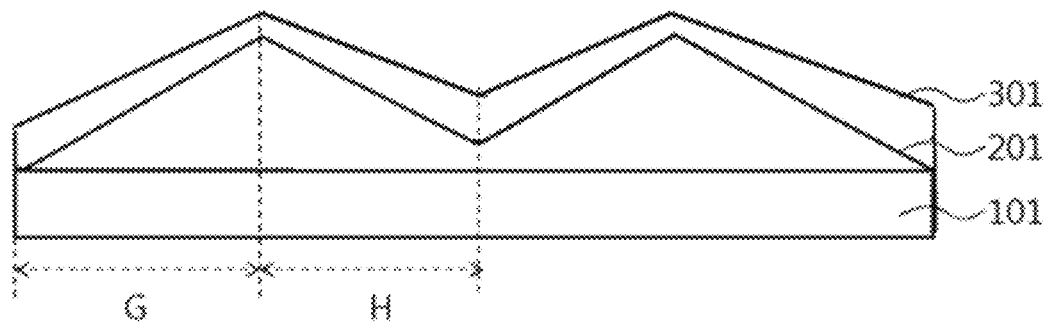

[Figure 24]
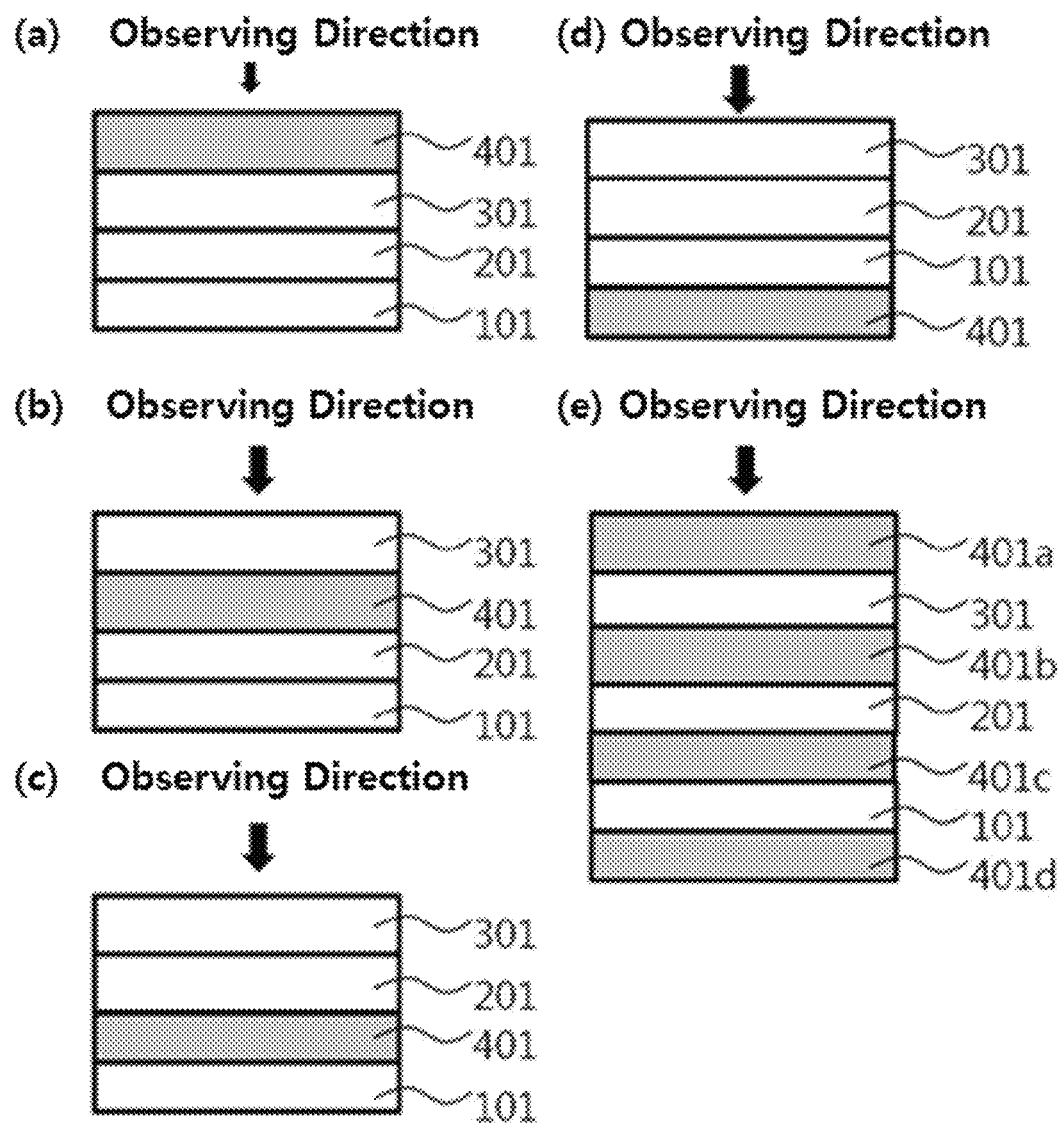

[Figure 25]
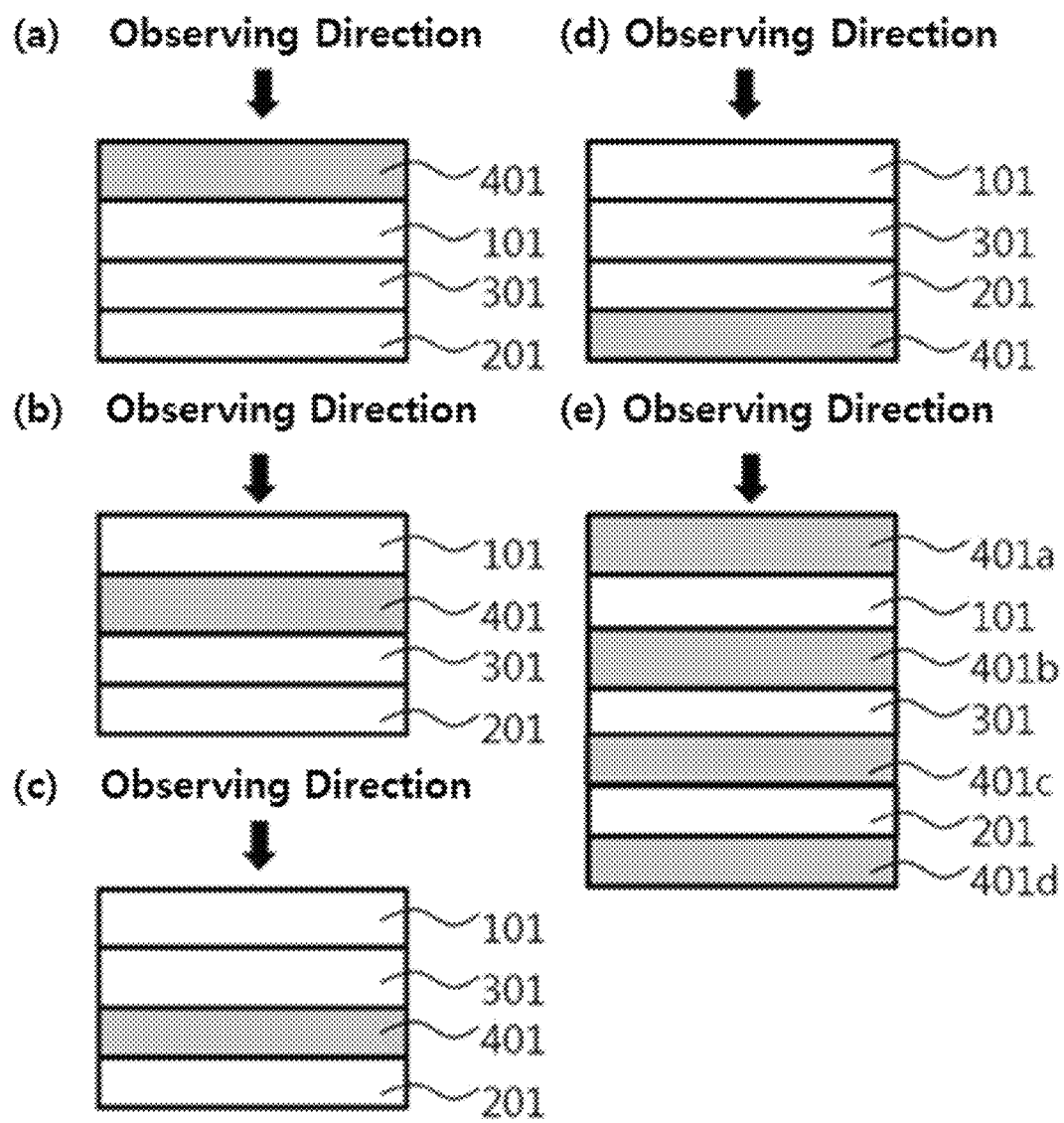

[Figure 26]
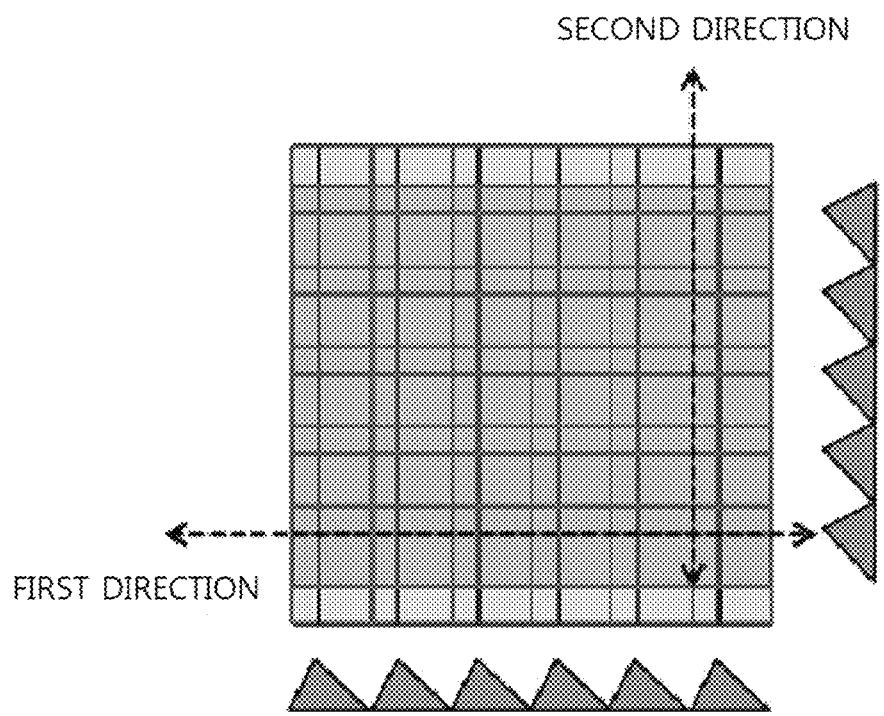

[Figure 27]
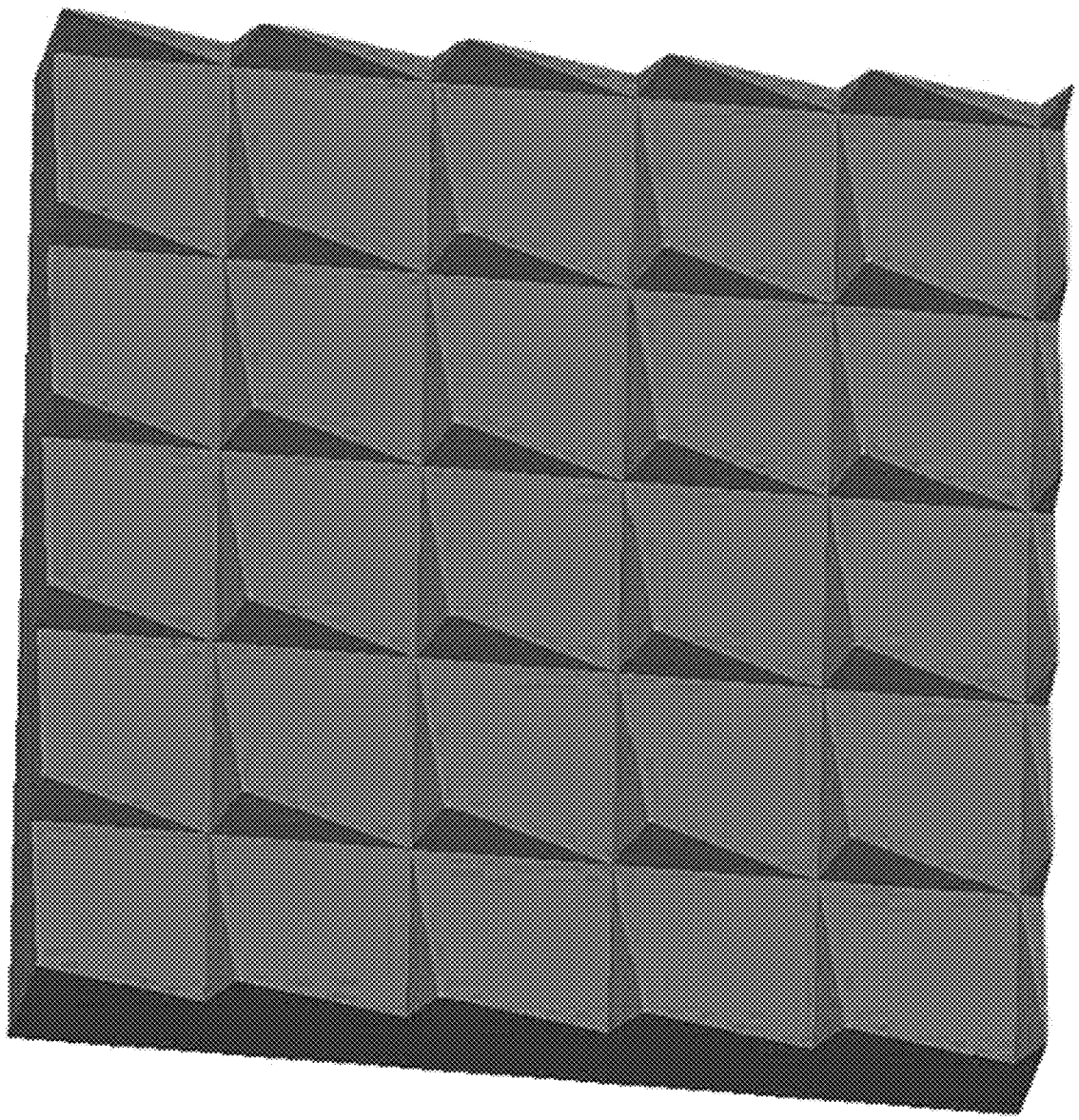

[Figure 28]
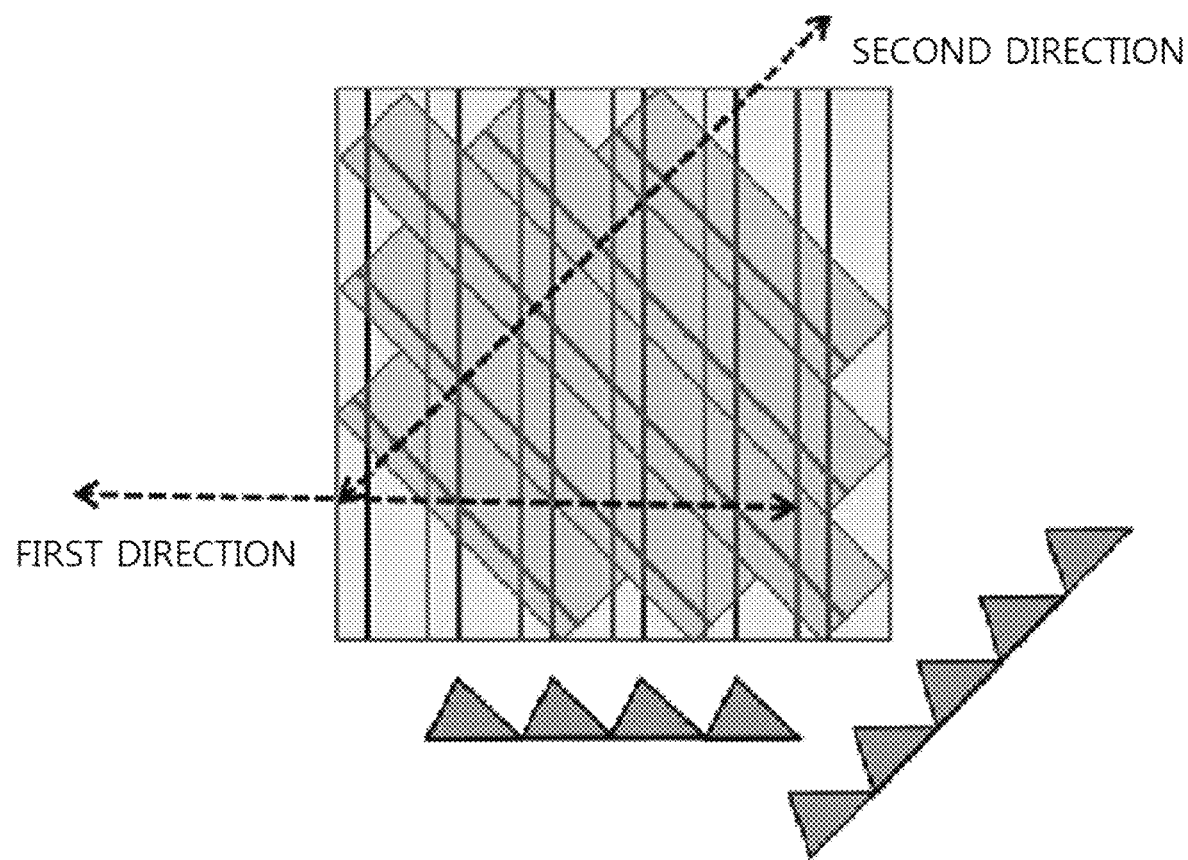

[Figure 29]
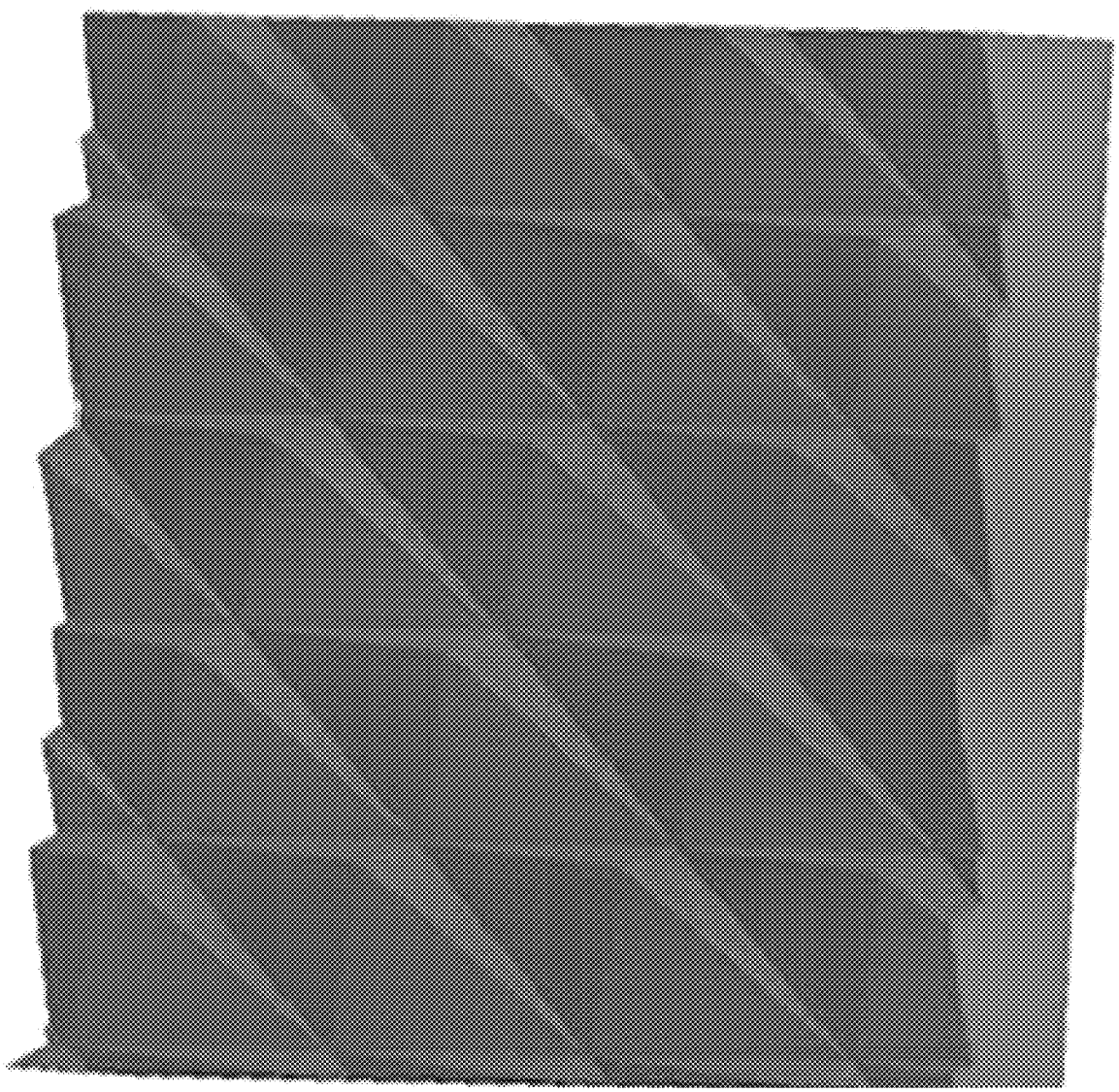

[Figure 30]
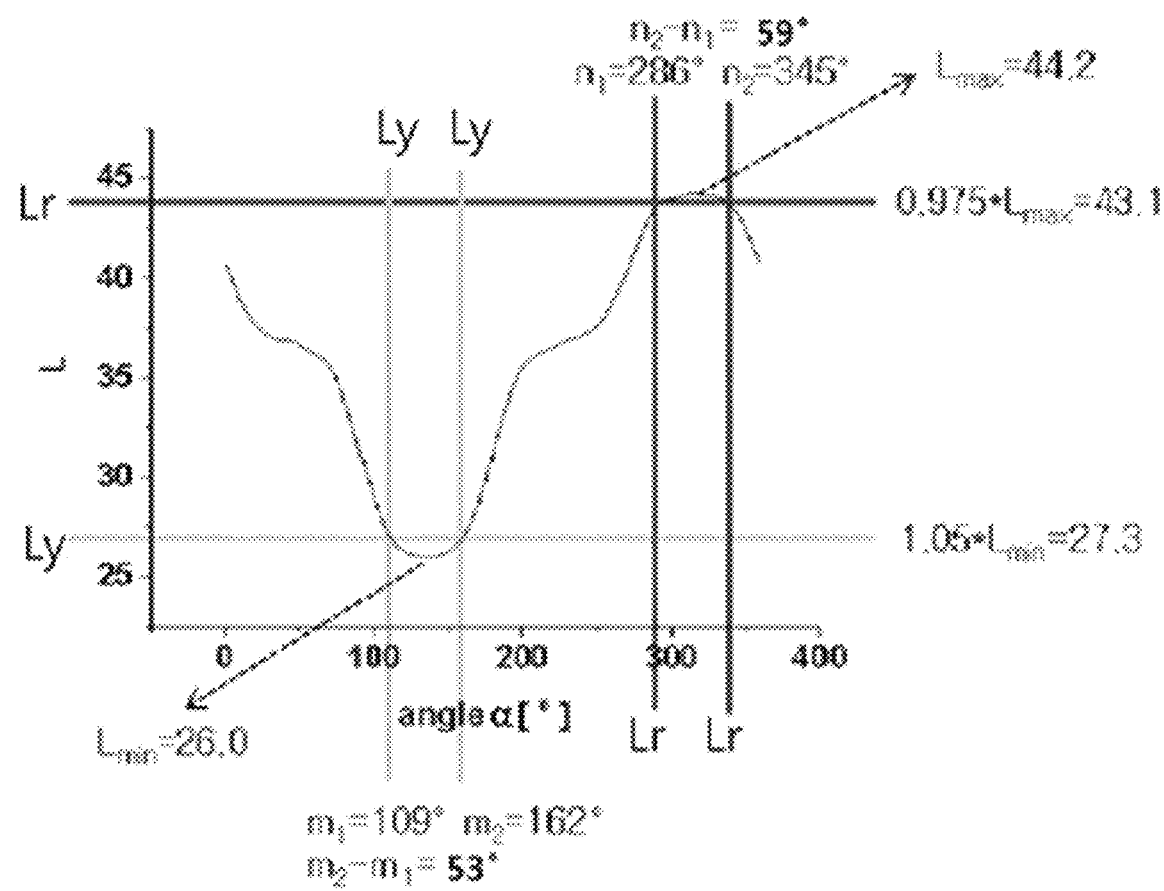

[Figure 31]
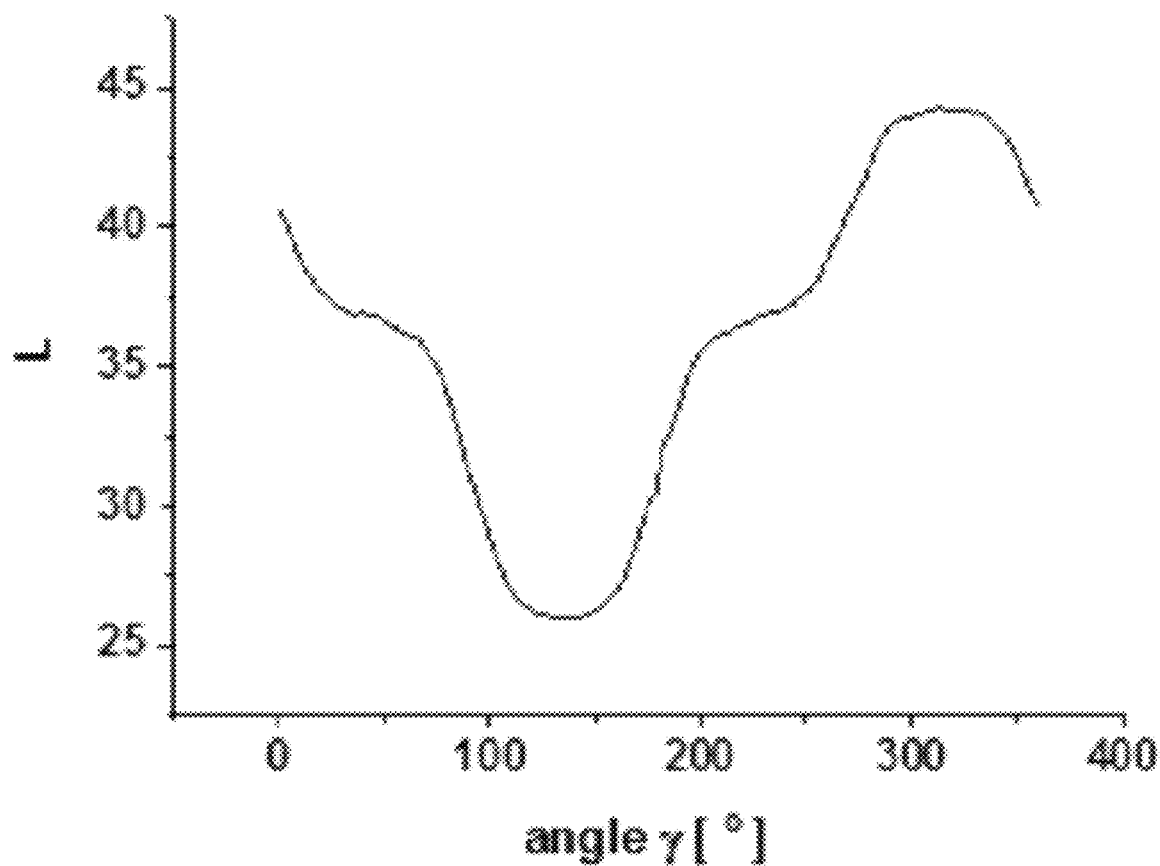

[Figure 32]
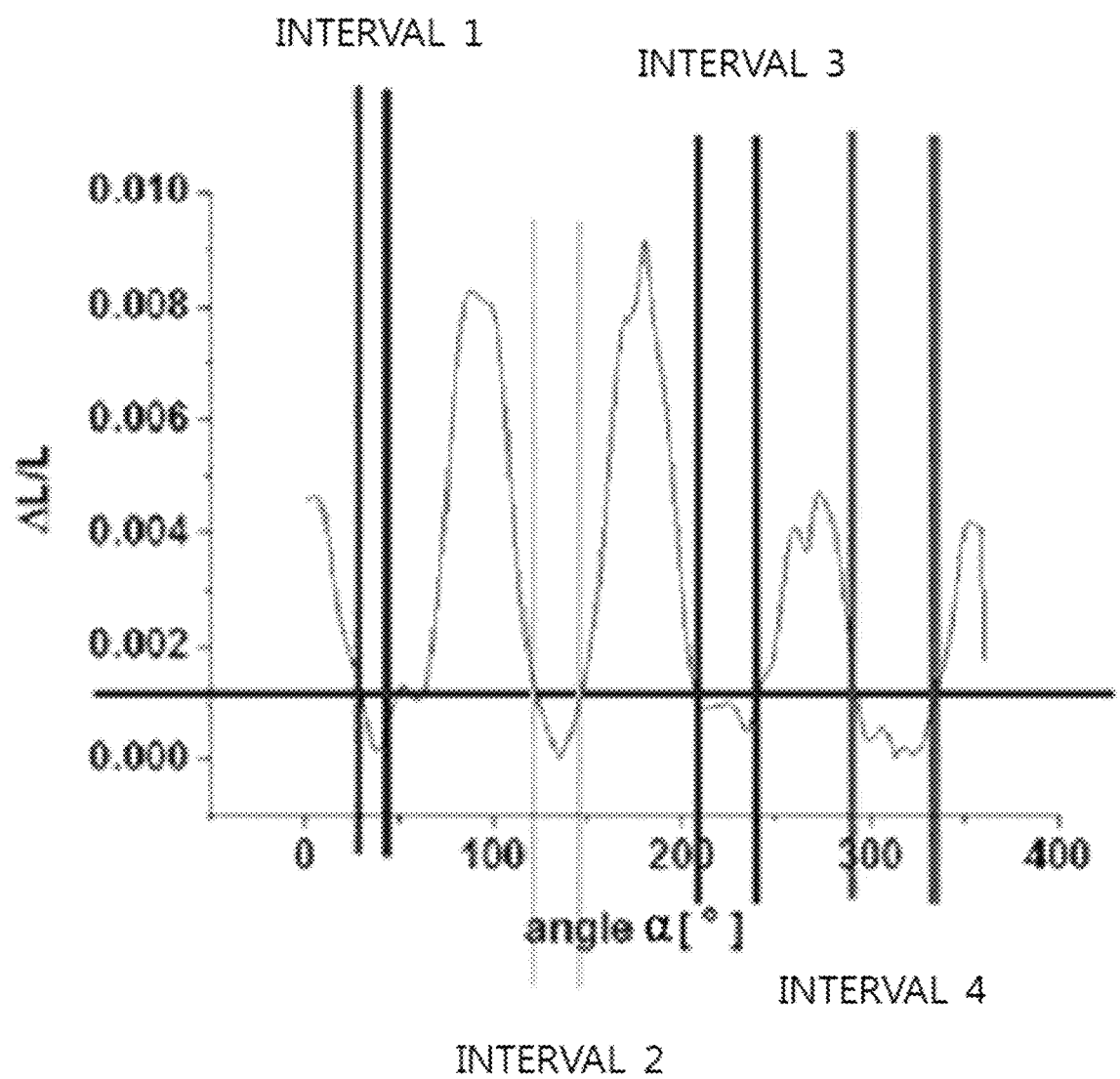

[Figure 33]
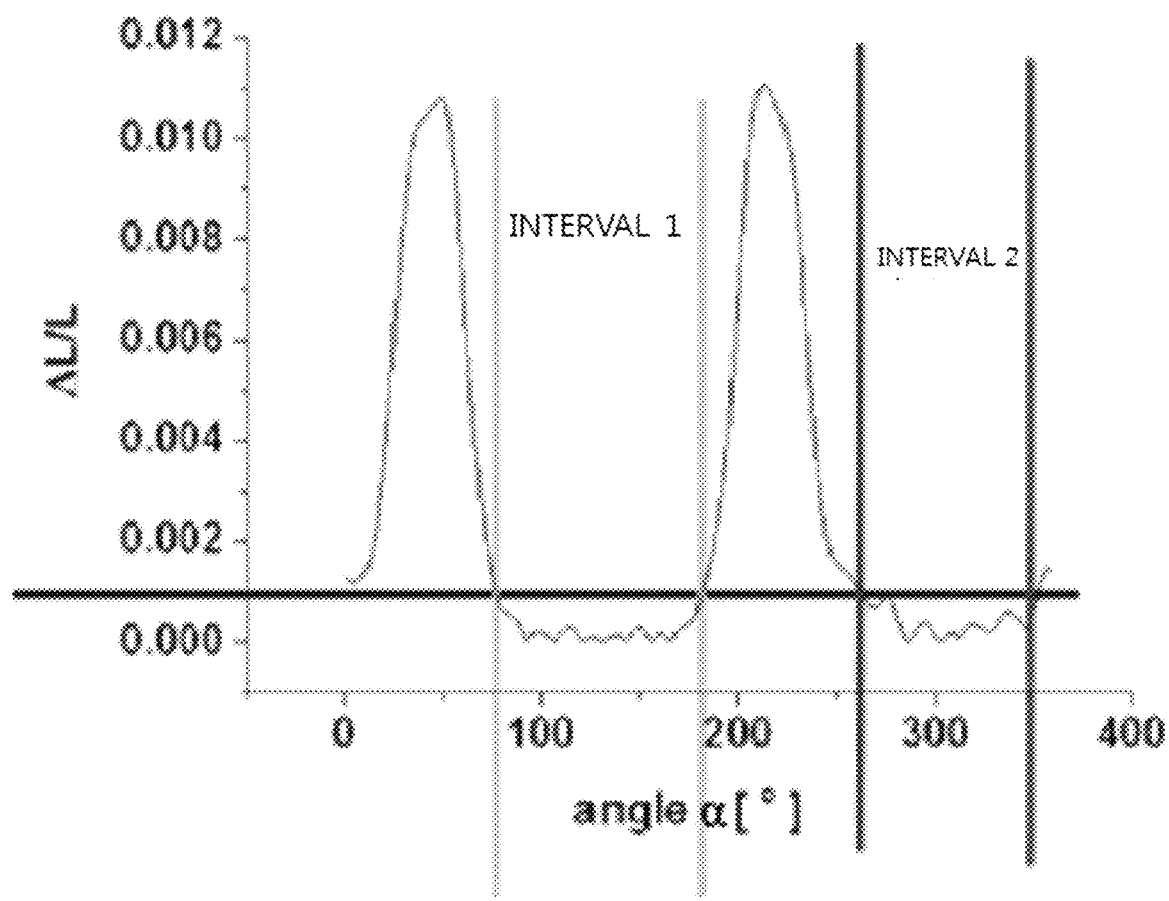

[Figure 34]
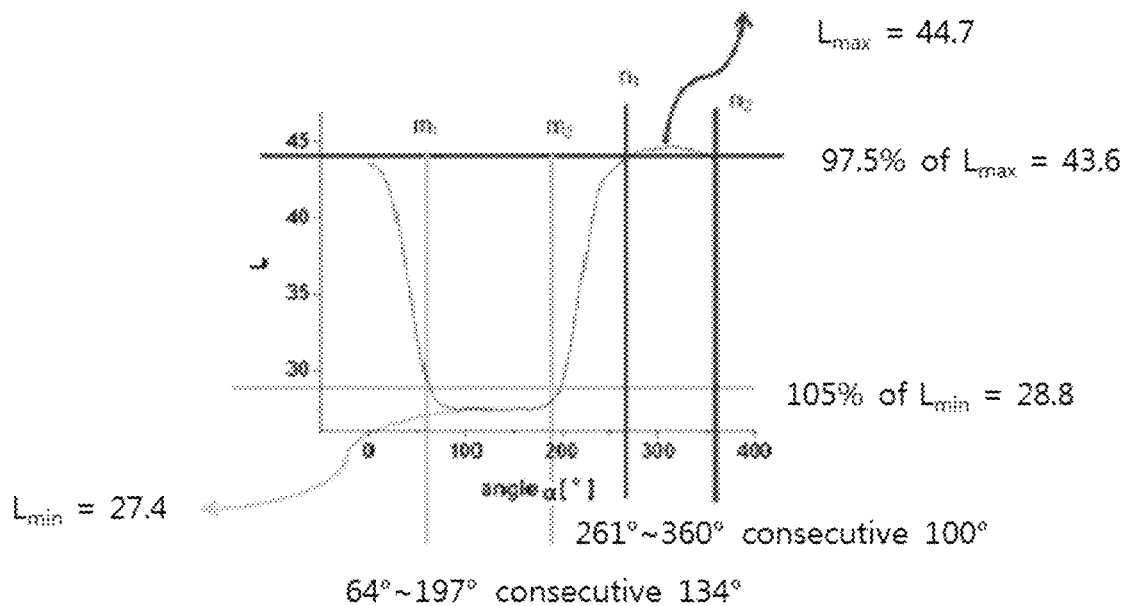

[Figure 35]
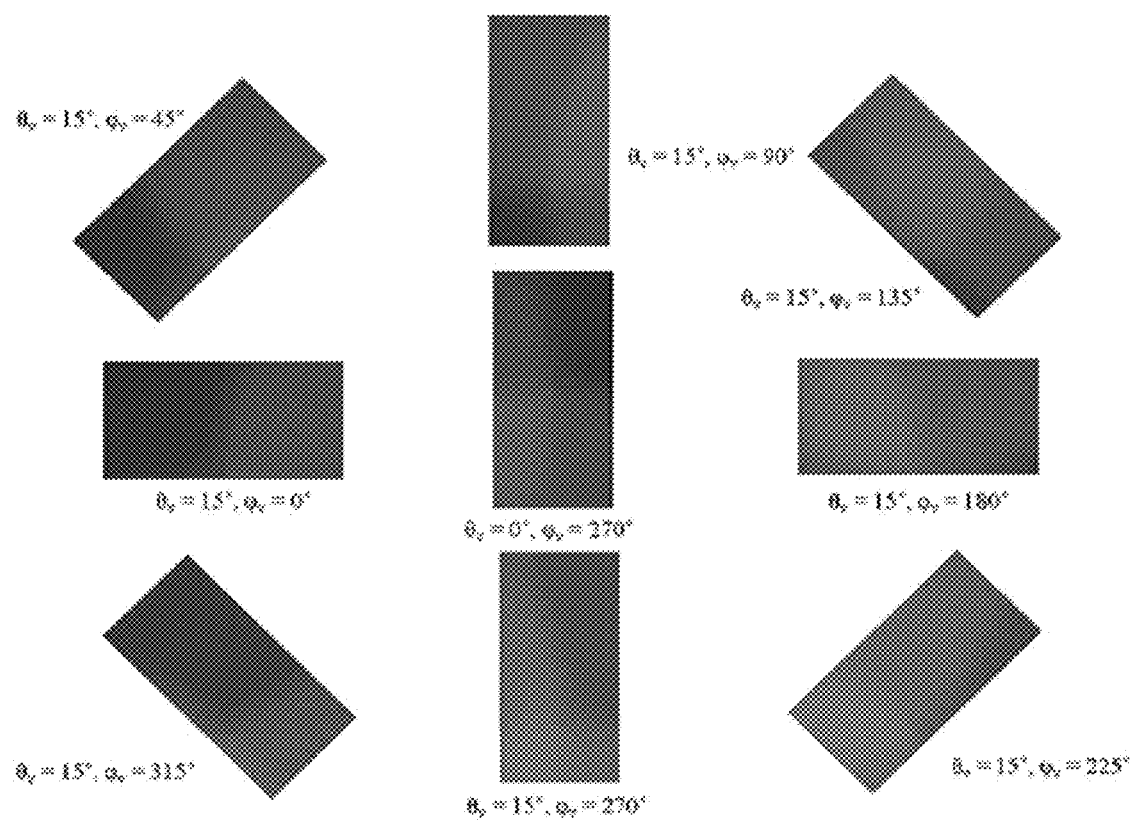

[Figure 36]
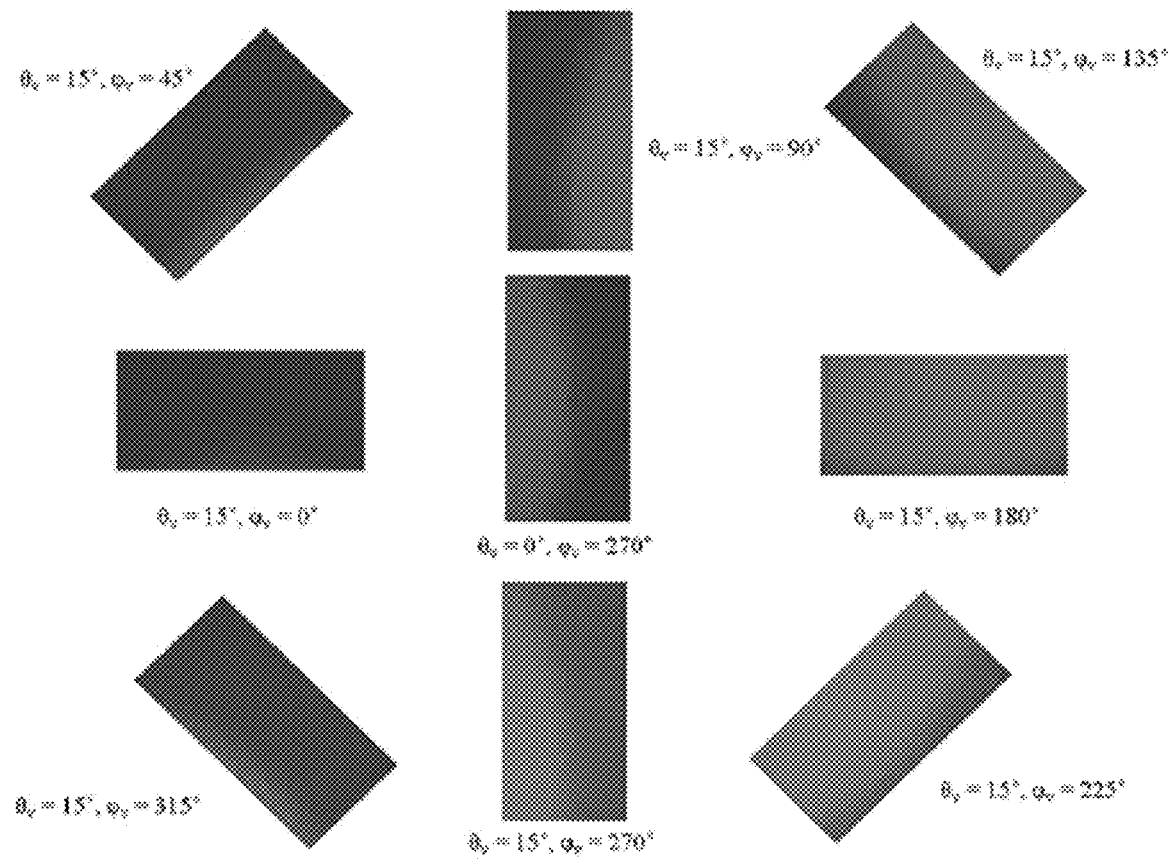

[Figure 37]
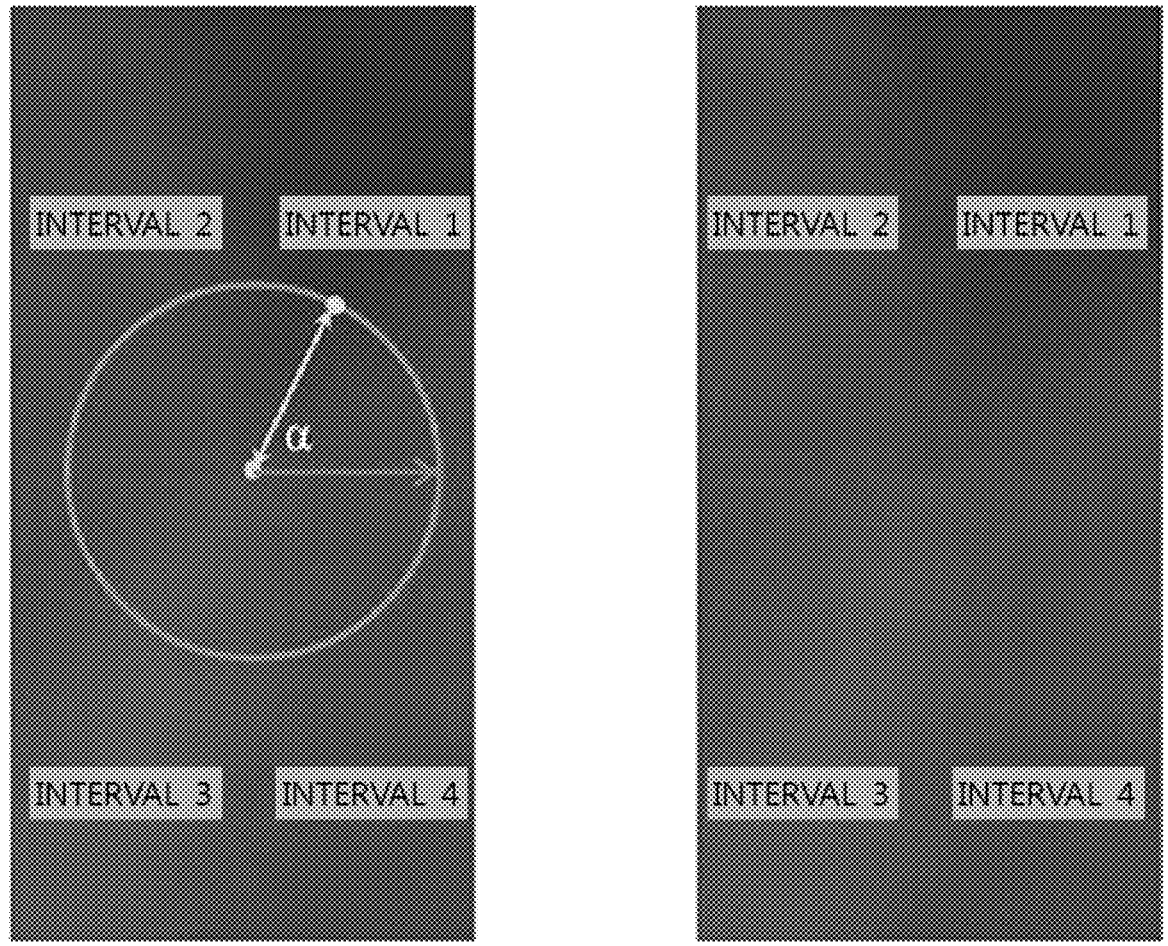
[Figure 38]
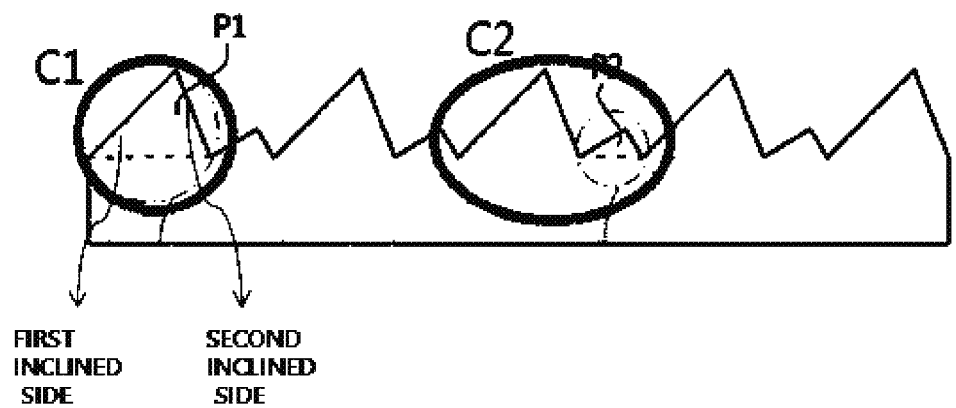

DECORATION MEMBER

The present application is a National Phase entry pursuant to 35 U.S.C § 371 of International Application No. PCT/KR2019/007281 filed Jun. 17, 2019 and claims priority to and the benefit of Korean Patent Application No. 10-2018-0069234 filed in the Korean Intellectual Property Office on Jun. 15, 2018, Korean Patent Application No. 10-2018-0118369 filed in the Korean Intellectual Property Office on Oct. 4, 2018, and Korean Patent Application No. 10-2019-0040237 filed in the Korean Intellectual Property Office on Apr. 5, 2019, the entire contents of which are incorporated herein by reference.

FIELD

This specification relates to a decoration member. Particularly, this specification relates to a decoration member suitable for use on a mobile device or an electronic product.

BACKGROUND

In cellular phones, various mobile devices, and home appliances, a design of a product, for example, a color, a shape, and a pattern play a big role in adding a value of the product to customers in addition to a function of the product. Product preference and price also depend on the design.

As an example, in the case of the cellular phone, various colors and color senses are implemented in various methods and applied to the product. There are a method for giving color to a cellular phone case material itself and a method for attaching a decoration film that implements the color and the shape to the case material to give the design.

Expression of the color in the existing decoration film is implemented through a method including printing, deposition, and the like. Characters or images are expressed in a color different from the background color through printing or a deposition method. However, when expressing heterogeneous colors on a single surface, the colors should be printed two or more times, and when it is desired to apply a variety of colors to a three-dimensional pattern, it is practically difficult to implement the expression of the colors. Further, in the existing decoration film, even though a viewing angle is changed, the color is fixed and even though there is a slight change, the change is limited to a difference degree of the color sense.

PATENT DOCUMENT

Korean Patent Unexamined Publication No. 10-2010-0135837

SUMMARY

This specification has been made in an effort to provide a decoration member having an excellent decoration effect as the number of regions where color and brightness are changed is large, and contrast of the color and the brightness of an adjacent region are large.

This specification provides a decoration member including:
a substrate; and
a decoration layer provided on the substrate,
wherein a brightness value L* on a CIE L*ab color coordinate is measured with respect to one point A1 on a circumference of any circle on the surface of the decoration layer by using a detector positioned at a (r, θ, φ) location of a spatial coordinate system having a center point of the surface of the decoration layer as an original point under a standard light source condition of D65 at a wavelength of 380 nm≤λ≤780 nm,
the spatial coordinate system includes an x axis in any one direction on the surface of the decoration layer, a y axis in another direction on the surface of the decoration layer perpendicular to the x axis, and a z axis in a normal direction to the surface of the decoration layer,
when a graph having an angle α formed between a straight line linking one point A1 on the circumference of the any circle and a center A0 of the any circle and a positive direction of the x axis as a horizontal axis and the measured brightness value L* as a vertical axis is graph G1,
in a range in which α of the graph G1 is 0 to 360°, the number n of consecutive intervals in which a length of the horizontal axis satisfying Equation A below is equal to or larger than 10° is 2 or more, and there are one or more combinations of θ and φ in which a contrast parameter $C_n$ represented by Equation 1 below is equal to or more than 0.1.

$$C_n = \sum_{i=1}^{n-1} 4 \times \left(\frac{M_i - M_{i+1}}{M_i + M_{i+1}}\right)^2 + 4\delta_n \times \left(\frac{M_n - M_1}{M_n + M_1}\right)^2 \quad \text{[Equation 1]}$$

$$\left|\frac{dL(\alpha)}{d\alpha}\right| \times \{L(\alpha)\}^{-1} \leq 0.001 \quad \text{[Equation A]}$$

$$M_i = \frac{\int_{\alpha_{i1}}^{\alpha_{i2}} L(\alpha) \, d\alpha}{\alpha_{i2} - \alpha_{i1}} \quad \text{[Equation B]}$$

In Equation 1,
$M_i$ means an average value of $L(\alpha)$ of consecutive i-th intervals $S_i$ in which the length of the horizontal axis satisfying Equation A above is 10° or more which is shown when α of the horizontal axis of the graph G1 increases and is represented by Equation B above,
n represents an integer of 2 or more,
when n is 2, δn is 0,
when n is 3 or more, δn is 1,
in Equations A and B, $L(\alpha)$ represents the brightness value L* on the CIE L*ab color coordinate according to the angle α formed between the straight line linking one point A1 on the circumference of the any circle and the center A0 of the any circle and the positive direction of the x axis, $$\left|\frac{dL(\alpha)}{d\alpha}\right|$$

means an absolute value of a slope of the brightness value $L(\alpha)$ for the angle α,
$\alpha_{i2}$ represents a largest α value of the consecutive i-th intervals $S_i$ in which the length of the horizontal axis satisfying Equation A above is 10° or more and the $\alpha_{i1}$ represents a smallest α value of the consecutive i-th intervals $S_i$ in which the length of the horizontal axis satisfying Equation A above is 10° or more,
r of the spatial coordinate system as a distance between the detector and the original point of the spatial coordinate system is 200 mm,
θ of the spatial coordinate system as an angle formed between a straight line passing through the detector and the original point of the spatial coordinate system and the z axis of the positive direction is in the range of 0 to 360°, φ of the spatial coordinate system as an angle formed between the straight line passing through the detector and the original point of the spatial coordinate system and the x axis of the positive direction is in the range of 0 to 360°, and a diameter of the any circle is 0.8 times a uniaxial length of the surface of the decoration layer.

According to embodiments disclosed in this specification, a decoration member having an excellent decoration effect is intended to be provided as the number of regions where a color and a brightness are changed is large and contrast of the color and the brightness of an adjacent region are large.

In particular, a decoration layer of the decoration member is formed in a structure including one or two or more light reflection layers and/or one or two or more light absorption layers, so that light reflection and/or light absorption are made on each of an incident path when external light is incident and a reflection path when the external light is reflected and constructive and destructive interference phenomena occur between the reflection lights which are generated on respective surfaces. A specific color can be expressed through light absorption and constructive interference and destructive interference phenomena on the incident path and the reflection path. Further, since the expressed color has thickness dependency, a color may be changed according to the thickness even when the decoration member has the same material composition. Therefore, when the light reflection layer and/or the light absorption layer has two or more points or regions having different thicknesses on the same surface, a plurality of colors may be expressed, and various colors may be implemented in a three-dimensional pattern by forming the color expression layer in the three-dimensional pattern.

BRIEF DESCRIPTION OF DRAWINGS

FIG. 1 illustrates a lamination structure of a decoration member according to an embodiment of this specification.

FIGS. 2 and 4 illustrate methods for determining (r, θ, φ) of a spatial coordinate system.

FIG. 3 illustrates a comparison of a diameter of an arbitrary circle and a short axis length of the surface of a decoration layer.

FIG. 5 is a diagram introduced to describe that structures are arranged in 2 dimensions.

FIGS. 6 to 16 illustrate shapes of a pattern layer according to certain embodiments.

FIG. 17 illustrates a light absorption layer and a light reflection layer.

FIG. 18 illustrates an action principle of constructive or destructive interference of reflection light.

FIGS. 19 to 23 illustrate shapes of a light absorption layer according to certain embodiments.

FIGS. 24(a)-25(e) illustrate lamination structures of a decoration member further including a color film according to various embodiments.

FIGS. 26 and 27 illustrate an array shape of convex type structures according to Embodiment 1.

FIGS. 28 and 29 illustrate an array shape of a convex type structures according to Embodiment 5.

FIGS. 30 to 32 are diagrams related to a brightness value L* on CIE L*ab color coordinates according to Evaluation Example 1.

FIGS. 33 and 34 are diagrams related to a brightness value L* on CIE L*ab color coordinates according to Evaluation Example 2.

FIGS. 35 and 37 are diagrams illustrated by observing the surface of a decoration member according to Evaluation Example 1.

FIG. 36 is a diagram illustrated by observing the surface of a decoration member according to Evaluation Example 2.

FIG. 38 illustrates the surface of a convex type structure.

DETAILED DESCRIPTION

Hereinafter, this specification will be described in more detail.

In this specification, "point" or "spot" means one location having no area. In this specification, the expression is used to indicate a specific location observed by an observer, or to indicate that there are two or more points at which the thicknesses of the light reflection layer or light absorption layer are different from each other.

In this specification, "region" represents a part which has a predetermined area. For example, when the decoration member is placed on the ground and a closing interval is partitioned on the upper surface of the decoration member in a direction perpendicular to the ground, the region means the area of the upper surface of the decoration member in the partitioned closing interval.

In this specification, the "surface" or "region" may be a flat surface, but is not limited thereto, and all or a part of surfaces may be a curved surface. For example, the shape of a vertical cross section may include a portion of an arc of a circle or ellipse, a wave structure, a structure such as zigzag, and the like.

In this specification, a "thickness" of a layer means a shortest distance from a lower surface to an upper surface of the layer.

In this specification, "or" means "and/or" when "or" selectively includes them listed or includes all of them listed, unless otherwise defined.

In this specification, "layer" means covering 70% or more of an area in which the layer exists. Preferably, the "layer" means covering 75% or more and preferably 80% or more.

This specification provides a decoration member including: a substrate; and a decoration layer provided on the substrate, wherein a brightness value L* on a CIE L*ab color coordinate is measured with respect to one point A1 on a circumference of any circle on the surface of the decoration layer by using a detector positioned at a (r, θ, φ) location of a spatial coordinate system having a center point of the surface of the decoration layer as an original point under a standard light source condition of D65 at a wavelength of 380 nm≤λ≤780 nm, the spatial coordinate system includes an x axis in any one direction on the surface of the decoration layer, a y axis in another direction on the surface of the decoration layer perpendicular to the x axis, and a z axis normal direction to the surface of the decoration layer, when a graph having an angle α formed between a straight line linking one point A1 on the circumference of the any circle and a center A0 of the any circle and a positive direction of the x axis as a horizontal axis and the measured brightness value L* as a vertical axis is graph G1, in a range in which α of the graph G1 is 0 to 360°, the number n of consecutive intervals in which a length of the horizontal axis satisfying Equation A below is equal to or larger than 10° is 2 or more, and there are one or more combinations of θ and φ in which a contrast parameter $C_n$ represented by Equation 1 below is equal to or more than 0.1.

$$C_n = \sum_{i=1}^{n-1} 4 \times \left(\frac{M_i - M_{i+1}}{M_i + M_{i+1}}\right)^2 + 4\delta_n \times \left(\frac{M_n - M_1}{M_n + M_1}\right)^2 \quad \text{[Equation 1]}$$

$$\left|\frac{dL(\alpha)}{d\alpha}\right| \times \{L(\alpha)\}^{-1} \leq 0.001 \quad \text{[Equation A]}$$

$$M_i = \frac{\int_{\alpha_{i1}}^{\alpha_{i2}} L(\alpha)\, d\alpha}{\alpha_{i2} - \alpha_{i1}} \quad \text{[Equation B]}$$

In Equation 1 above, $M_i$ means an average value of $L(\alpha)$ of consecutive i-th intervals $S_i$ in which the length of the horizontal axis satisfying Equation A above is 10° or more which is shown when α of the horizontal axis of the graph G1 increases and is represented by Equation B above, n represents an integer of 2 or more, when n is 2, δn is 0, when n is 3 or more, δn is 1, in Equations A and B, $L(\alpha)$ represents the brightness value L* on the CIE L*ab color coordinate according to the angle α formed between the straight line linking one point A1 on the circumference of the any circle and the center A0 of the any circle and the positive direction of the x axis, $$\left|\frac{dL(\alpha)}{d\alpha}\right|$$

means an absolute value of a slope of the brightness value $L(\alpha)$ for the angle α, $\alpha_{i2}$ represents a largest α value of the consecutive i-th intervals $S_i$ in which the length of the horizontal axis satisfying Equation A above is 10° or more and the $\alpha_{i1}$ represents a smallest α value of the consecutive i-th intervals $S_i$ in which the length of the horizontal axis satisfying Equation A above is 10° or more.

r of the spatial coordinate system as a distance between the detector and the original point of the spatial coordinate system is 200 mm, θ of the spatial coordinate system as an angle formed between a straight line passing through the detector and the original point of the spatial coordinate system and the z axis of the positive direction is in the range of 0 to 360°, φ of the spatial coordinate system as an angle formed between the straight line passing through the detector and the original point of the spatial coordinate system and the x axis of the positive direction is in the range of 0 to 360°, and a diameter of the any circle is 0.8 times a uniaxial length of the surface of the decoration layer.

In an embodiment of this specification, the decoration member may have a contrast parameter C represented by Equation 1 of 0.1 or more, preferably 0.2 or more, and more preferably 0.3 or more. Satisfying the numerical range means that the number of intervals in which the color of the decoration member changes is large or the color change is largely felt on the observer's eye.

In an embodiment of this specification, in the range where α of the graph G1 is 0° to 360°, the number n of consecutive intervals having a length of a horizontal axis satisfying Equation A of 10° or more is 2, and Equation 1 may be represented by Equation 1-2.

$$C_2 = 4 \times \left(\frac{M_1 - M_2}{M_1 + M_2}\right)^2 \quad \text{[Equation 1-2]}$$

In an embodiment of this specification, in the range where α of the graph G1 is 0° to 360°, the number n of consecutive intervals having a length of a horizontal axis satisfying Equation A of 10° or more is 3 or more, and Equation 1 may be represented by Equation 1-3 below.

$$C_n = \sum_{i=1}^{n-1} 4 \times \left(\frac{M_i - M_{i+1}}{M_i + M_{i+1}}\right)^2 + 4 \times \left(\frac{M_n - M_1}{M_n + M_1}\right)^2 \quad \text{[Equation 1-3]}$$

In an embodiment of this specification, in the range where α of the graph G1 is 0° to 360°, the number n of consecutive intervals having a length of a horizontal axis satisfying Equation A of 10° or more is 3, and Equation 1 may be represented by Equation 1-4 below.

$$C_3 = 4 \times \left(\frac{M_1 - M_2}{M_1 + M_2}\right)^2 + 4 \times \left(\frac{M_2 - M_3}{M_2 + M_3}\right)^2 + 4 \times \left(\frac{M_3 - M_1}{M_3 + M_1}\right)^2 \quad \text{[Equation 1-4]}$$

In an embodiment of this specification, in the range where α of the graph G1 is 0° to 360°, the number n of consecutive intervals having a length of a horizontal axis satisfying Equation A of 10° or more is 4, and Equation 1 may be represented by Equation 1-5.

$$C_4 = 4 \times \left(\frac{M_1 - M_2}{M_1 + M_2}\right)^2 + 4 \times \left(\frac{M_2 - M_3}{M_2 + M_3}\right)^2 + 4 \times \left(\frac{M_3 - M_4}{M_3 + M_4}\right)^2 + 4 \times \left(\frac{M_4 - M_1}{M_4 + M_1}\right)^2 \quad \text{[Equation 1-5]}$$

In this specification, a continuous interval in which the length of the horizontal axis satisfying Equation A is 10° or more means that all α in a range in which the length of the horizontal axis in the interval is 10° or more satisfies Equation A. That is, $C_n$ may be a sum of all difference values of $L(\alpha)$ between two or more intervals $S_i$ satisfying Equation A.

In this specification, the spatial coordinate system includes an x axis in one direction on the surface of the decoration layer, a y axis in another direction on the surface of the decoration layer perpendicular to the x axis, and a z axis normal to the surface of the decoration layer. The spatial coordinate system is introduced to specify the position of the detector for observing the decoration layer.

In this specification, the detector is located at the position (r, θ, φ) of the spatial coordinate system whose starting point is the center point of the surface of the decoration layer. FIGS. 2 and 4 illustrate a method for determining (r, θ, φ) of a spatial coordinate system. r of the spatial coordinate system is 200 mm as a distance from the starting point of the spatial coordinate system of the detector, θ of the spatial coordinate system is an angle formed between a straight line passing through the detector and the starting point of the spatial coordinate system and the z-axis in the positive direction, and φ of the spatial coordinate system is an angle formed between a straight line passing through the detector and the starting point of the spatial coordinate system and the x-axis in the positive direction.

The method of specifying the position of the detector may be represented by an orthogonal coordinate system of (x, y, z) or a spherical coordinate system of (r, θ, φ). The orthogonal coordinate system and the spherical coordinate system may be converted as shown in Table 1 by the respective change formula.

TABLE 1

| When converting from orthogonal coordinate system to spherical coordinate system | When converting from spherical coordinate system to orthogonal coordinate system |
|---|---|
| $r = \sqrt{x^2 + y^2 + z^2}$ | $x = r \sin\theta \cos\phi$ |
| $\theta = \arccos\dfrac{z}{r}$ | $y = r \sin\theta \sin\phi$ |
| $\phi = \arctan\dfrac{y}{x}$ | $z = r \cos\theta$ |

In this specification, the detector may be the human eye or may be a mechanical detector such as a camera. In the case where there are two or more detectors such as both eyes of a person, the detector may mean the center of two or more detectors. In this specification, the "uniaxial length of the decoration layer" may refer to as a distance between both ends of the decoration layer in the x-axial or y-axis direction. For example, when the shape of the decoration layer in a direction parallel to the x-y axis plane of the decoration layer is a rectangular shape, the width of the short side of the rectangle may be defined as the uniaxial length. Referring to FIG. 3, the uniaxial length may mean the length of the shortest straight line among the straight lines on the y-axis passing through the starting point of the spatial coordinate system.

In this specification, the diameter of the arbitrary circle is 0.8 times larger than the uniaxial length of the surface of the decoration layer. FIG. 3 shows that the diameter of any of the circles is 0.8 times larger than the uniaxial length of the surface of the decoration layer.

In this specification, the detector is not particularly limited as long as it is for measuring the brightness value L* on the CIE L*ab color coordinates with respect to a point A1 on the circumference of the arbitrary circle, for example, suitable spectrophotometers include: CM-2600d or TOPCON SR-UL2 or BM-7 by Konica Minolta.

In this specification, the brightness value L* may be calculated by reflection measurement or optical simulation at an interval of 5 mm or less at a wavelength of 380 nm≤λ≤780 nm of the incident light D65 light source. The reflection measurement may be performed using SolidSpec-3700 (Shimadzu) or 7800 series (X-rite), or by using a halogen lamp, a monochromator or a goniometer. The optical simulation may use a method of calculating angle (φ) reflected light reflected from the decoration member when the incident light is a D65 standard light source. In addition, the angle (φ) reflected light can be measured by adjusting at intervals of 5° or less in the range of 0° to 360°.

In this specification, a graph in which an angle (α) formed between a straight line connecting the one point A1 on the circumference of the arbitrary circle and the center A0 of the arbitrary circle and a positive direction of the x-axis is set as the horizontal axis, and the measured brightness value L* is set as the vertical axis is called a graph G1. The L* value of a point on the circumference of an arbitrary circle when the angle α is 0 degree may be measured, and the L* value may be measured by increasing the angle α by 1 or 5 degrees to represent a graph G1.

In this specification, in the range where α of the graph G1 is 0° to 360°, there are two or more consecutive intervals having a length of a horizontal axis satisfying the following Equation A of 10° or more. This interval refers to an interval in which the amount of change in L* value is not large according to the change of α, and refers to an interval recognized as an interval in which light of constant brightness is emitted to the observer's eye.

$$\left|\frac{dL(\alpha)}{d\alpha}\right| \times \{L(\alpha)\}^{-1} \leq 0.001 \qquad \text{[Equation A]}$$

In an embodiment of this specification, the length of the horizontal axis that satisfies Equation A may be 11° or more, 15° or more, or 20° or more.

In an embodiment of this specification, two, three, or four consecutive intervals having a horizontal axis length of 10° or more satisfying Equation A may be provided.

In an embodiment of this specification, $M_i$ means an average value of $L(\alpha)$ of consecutive i-th interval $S_i$ having the length of a horizontal axis satisfying Equation A of 10° or more, which appears when α of the horizontal axis of the graph G1 increases and is represented by following Equation B.

$$M_i = \frac{\int_{\alpha_{i1}}^{\alpha_{i2}} L(\alpha) d\alpha}{\alpha_{i2} - \alpha_{i1}} \qquad \text{[Equation B]}$$

In Equations A and B, L (α) is a brightness value L* on the CIE L*ab color coordinate according to the angle α formed between a straight line connecting one point A1 on the circumference of the arbitrary circle and the center A0 of the arbitrary circle, and the positive direction of the x-axis.

$$\left|\frac{dL(\alpha)}{d\alpha}\right|$$

denotes the absolute value of the slope of the brightness value L (α) for each α, the ail is the largest α value of the consecutive i-th interval $S_i$ in which the length of the horizontal axis satisfying Equation A is 10° or more, and $\alpha_{i1}$ is the smallest α value of the consecutive i-th interval $S_i$ in which the length of the horizontal axis satisfying Equation A is 10° or more.

Equation B denotes an average value of brightness L (α) in the corresponding intervals ail to ail.

The 'consecutive interval' refers to an interval that always satisfies the above-described range of conditions in the angular range.

In an embodiment of this specification, the decoration member may have at least one combination of m1 and m2 satisfying Equation 2, Equation 2-1, and Equation 2-2 below.

$$L(m1)=1.05 \times L_{min} \quad \text{[Equation 2]}$$

$$L(m2)=1.05 \times L_{min} \quad \text{[Equation 2-1]}$$

$$|m2-m1| \geq 20° \quad \text{[Equation 2-2]}$$

In Equations 2 to 2-2, m1 and m2 are different from each other as a value corresponding to α of L (α), $L_{min}$ is the minimum value of L (α) of the graph G1 in a range of α from 0° to 360°.

In an embodiment of this specification, Equation 2-2 may be represented by Equation 2-2-1 or Equation 2-2-2 below.

$$|m2-m1| \geq 30° \quad \text{[Equation 2-2-1]}$$

$$|m2-m1| \geq 50° \quad \text{[Equation 2-2-2]}$$

In an embodiment of this specification, the decoration member may have at least one combination of n1 and n2 satisfying Equation 3, Equation 3-1, and Equation 3-2 below.

$$L(n1)=0.975 \times L_{max} \quad \text{[Equation 3]}$$

$$L(n2)=0.975 \times L_{max} \quad \text{[Equation 3-1]}$$

$$|n2-n1| \geq 20° \quad \text{[Equation 3-2]}$$

In Equations 3 to 3-2, n1 and n2 are different from each other as a value corresponding to α of L (α), and $L_{max}$ is the maximum value of L (α) of the graph G1 in a range of α from 0° to 360°.

In an embodiment of this specification, Equation 3-2 may be represented by Equation 3-2-1 or Equation 3-2-2 below.

$$|n2-n1| \geq 30° \quad \text{[Equation 3-2-1]}$$

$$|n2-n1| \geq 50° \quad \text{[Equation 3-2-2]}$$

FIG. 30 illustrates a method of determining m1, m2, n1 and n2. Since the value of $L_{min}$ is 26.0, the value corresponding to $1.05*L_{min}$ is 27.3, and since the value of $L_{max}$ is 44.2, the value corresponding to $0.975*L_{max}$ is 43.1. At this time, since a point meeting a straight line of $L*=1.05*L_{min}$ (yellow line segment, $L_y$) is 109° and 162°, m1 is 109° and m2 is 162°. At this time, m2−m1=53°.

In addition, since a point meeting a straight line of $L*=0.975*L_{max}$ (red line segment, $L_r$) is 286° and 345°, n1 is 286° and n2 is 345°. At this time, n2−n1=59°.

In an embodiment of this specification, the decoration member has one or more $M_i$ that satisfies Equations 4 and 5 below.

$$\frac{|M_i - L_{max}|}{M_i} \geq 0.1 \quad \text{[Equation 4]}$$

$$\frac{|M_i - L_{min}|}{M_i} \geq 0.1 \quad \text{[Equation 5]}$$

In Equations 4 and 5 above, $L_{min}$ is the minimum value of L (α) of the graph G1 in a range of α from 0° to 360°, $L_{max}$ is the maximum value of L (α) of the graph G1 in a range of α from 0° to 360°, and The definition of $M_i$ is as described above.

In an embodiment of this specification, θ of the spatial coordinate system may be 0° or more and 15° or less.

In an embodiment of this specification, when the surface of the decoration layer is divided by a reference area of 2.5 mm×2.5 mm size, the angular luminance of light having a wavelength of 380 nm≤λ≤780 nm emitted from each reference area may be the same. The same angular luminance means that angular luminance of light having a wavelength λ emitted from each reference area is the same regardless of the surface position (x, y) value of the decoration layer.

The angular luminance may be calculated by reflection measurement or optical simulation at intervals of 5 nm or less at a wavelength of 380 nm≤λ≤780 nm of the incident light D65 light source. Reflection measurement may be performed using Shimadzu SolidSpec-3700, Konica Minolta CM-2600d, CM-M6, etc., or using a halogen lamp, a monochromator and a Goniometer. The optical simulation may calculate angle (φ) reflected light reflected from the pattern when the incident light is a D65 standard light source at a wavelength of 380 nm≤λ≤780 nm at intervals of 5 nm or less. Also, the reflected light for each angle may be calculated at 5° intervals or less in the range of 0≤φ≤360°.

In an embodiment of this specification, the substrate includes a convex type structure or a concave type structure arranged in one dimension.

In this specification, the one-dimensionally arranged convex or concave type structure is a pattern including a structure that is repeated in one direction (one dimension) such as a prism and a lenticular pattern.

In an embodiment of this specification, a pitch in the one-dimensional direction of the one-dimensionally arranged convex or concave type structure is greater than 0 mm and 1 mm or less.

In an embodiment of this specification, the substrate includes a convex type structure or a concave type structure two-dimensionally arranged in the first axis direction and the second axis direction forming an angle of more than 0 degrees with the first axis direction. The clockwise direction refers to an angle formed by the second axis direction in the clockwise direction with respect to the first axis.

In an embodiment of this specification, the two-dimensionally arranged convex type structure or concave type structure has a pattern including a structure that is repeated in two directions (two dimensions), such as a microlens array.

In an embodiment of this specification, each pitch in the two-dimensional direction of the two-dimensionally arranged convex or concave type structure is 1 mm or less.

The decoration member is provided with a substrate including a two-dimensionally convex type structure or concave type structure, thereby showing an effect that dichroism of the decoration member may appear in various directions. On the other hand, by adjusting the direction in which each structure is arranged in a specific angle range, the decoration member shows an effect of adjusting the direction in which the dichroism appears in a desired range.

In this specification, the substrate region provided with the convex type structure or the concave type structure of the "substrate including the convex type structure or the concave type structure" may be referred to as a pattern layer.

In this specification, the two-dimensional array of the structures means that the directions in which the structures are arranged are two different directions. For example, as illustrated in FIG. 5, when a line segment linking a highest point of any convex type structure or a lowest point C0 of the concave type structure and the highest point of another convex type structure or the lowest point C1 of a concave type structure adjacent to any convex type structure or concave type structure is set as a first axis and the line segment linking the highest point of any convex type structure or the lowest point C0 of concave type structure and the highest point of another convex type structure or the lowest point C2 of another concave type structure adjacent to the any convex type structure or concave type structure and not existing on the first axis is set as a second axis, the two-dimensional array means that the structures are arranged in two directions, i.e., directions of the first axis and the second axis.

In this specification, the "convex type structure" means a structure having a convex shape as compared with other parts of the periphery, and the shape thereof is not limited unless it is particularly limited. Further, the "concave type structure" means a structure having a concave shape as compared with other parts of the periphery, and the shape thereof is not limited unless it is particularly limited.

As described above, the decoration member may express dichroism by the convex type structure or concave type structure included in the substrate. Dichroism means that different colors are observed depending on the viewing angle. The color may be represented by CIE L*a*b* and the color difference may be defined using a distance ΔE*ab in the L*a*b*space. Specifically, the color difference is $\Delta E^*ab = \sqrt{(\Delta L)^2 + (\Delta a)^2 + (\Delta b)^2}$ and an observer may not recognize the color difference within the range of 0<ΔE*ab<1 [Reference Document: Machine Graphics and Vision 20 (4):383-411]. Accordingly, in this specification, the dichroism may be defined as ΔE*ab>1.

In an embodiment of this specification, the two-dimensionally arranged structures may be arranged in the first axis direction and the second axis direction forming an angle of 1 degree or more and 175 degrees or less with the first axis clockwise.

In an embodiment of this specification, the two-dimensionally arranged convex type structure or concave type structure may be arranged in the first axis direction and the second axis direction forming an angle of 30 degrees or more and 150 degrees or less with the first axis clockwise.

In this specification, the "first axis direction" refers to the direction of the straight line formed by the first axis, and the "second axis direction" refers to the direction of the straight line formed by the second axis.

In this specification, the "first axis direction" and the "second axis direction" may refer to any one direction in which two or more identical cross sections appear among the cross sections of the convex type structure or the concave type structure. For example, referring to FIG. 5, among the convex type structures of the substrate of the decoration member of FIG. 5, a straight line that links the highest point C0 of any convex type structure to the highest point C1 of the convex type structure most adjacent to the highest point C1 is referred to as the first axis. Further, a line segment that links the highest point C2 of another convex type structure adjacent to the highest point C0 of the any convex type structure may be referred to as the second axis.

In an embodiment of this specification, the "highest point" of the convex type structure refers to a most convex portion of the convex type structure, and may mean any spot of the convex type structure closest to the inorganic layer or the substrate. When the most convex portion of the convex type structure is pointed, the spot may be set as the highest point. In addition, when there are two or more highest points of the convex type structure, specifically, when a highest portion of the convex type structure is a plane, a center point of the plane may be referred to as the highest point. For example, when the convex type structure has a truncated cone shape, the highest point of the convex type structure forms a planar circle and the center point of the circle may be referred to as the highest point of the convex type structure.

In an embodiment of this specification, a clockwise angle formed by the first axis direction and the second axis direction may be calculated by measuring an angle formed clockwise by the first and second axes on a virtual plane formed by the first and second axes.

The number of convex type structures or concave type structures is $1/mm^2$ to $1,000,000/mm^2$, preferably $1/\mu m^2$ to $500,000/mm^2$, more preferably $1/\mu m^2$ to $250,000/mm^2$ relative to the area of the substrate surface. When the above numerical range is satisfied, the numbers of the convex and concave type structures included in the substrate are adjusted, so that dichroism is further increased. In this case, $mm^2$ or $\mu m^2$ of a denominator means $1\ mm^2$ or $1\ \mu m^2$ as a unit area of the substrate surface.

The area of the substrate surface may be the total area of the substrate including the structure and the number of structures means the number of structures in the area. The number of structures may be calculated by counting the number of highest points of the convex type structure or the number of lowest points of the concave type structure.

In this specification, the "cross section" means the surface at the time of cutting the convex type structure or concave type structure in any one direction. For example, when the decoration member is placed on the ground, the cross section may mean a surface when the convex type structure or concave type structure is cut in a direction parallel to the ground or perpendicular to the ground.

In this specification, the "cross section of the asymmetric structure" means that a figure configured by a periphery of the cross section has a structure which does not have line symmetry or point symmetry. The line symmetry refers to a case where a property is shown in which when a predetermined figure is made to be symmetric around one straight line, the figure is overlapped. The point symmetry means a case where a symmetrical property is shown in which when a predetermined figure rotates at 180 degrees around one point, the predetermined figure completely overlaps with an original figure. Here, the periphery of the cross section of the asymmetric structure may be the straight line, a curved line, or a combination thereof.

The shapes of the convex type structure and the concave type structure may be observed through the cross section of the structure.

In this specification, unless mentioned otherwise, the "convex shape" or the "concave shape" means a shape represented by the cross section of the convex type structure or the concave type structure. The convex shape or the concave shape may include one or more convexes or concaves described above.

In this specification, the "convex shape" may include one or more "convex unit shapes" and the "concave shape" may include one or more "concave unit shapes". The convex unit shape or the concave unit shape means a shape including two inclined sides (a first inclined side and a second inclined side) and is not a shape including three or more inclined sides. Referring to FIG. 38, a convex shape P1 of a circle C1 has a convex unit shape including a first inclined side and a second inclined side. However, a convex shape contained in a circle C2 includes two convex unit shapes. Each first inclined side may be defined as a left inclined side of the convex shape or the concave shape and each second inclined side may mean a right inclined side of the convex shape or the concave shape.

In this specification, unless mentioned otherwise, the "convex shape" may mean a "convex unit shape" and the "concave shape" may mean a "concave unit shape".

In this specification, the "cross section of an asymmetric structure" means that the cross section of the convex type structure or the concave type structure has the convex shape or the concave shape and the convex unit shape or the concave unit shape included in the convex shape or the concave shape is a cross-sectional shape of the asymmetric structure. For example, the meaning that the cross section of the convex type structure includes the cross section of the asymmetric structure may represent that the cross section of the convex type structure has the convex shape including two or more convex unit shapes and the convex unit shape is the asymmetric structure. In addition, the "convex shape or concave shape which has the cross section of the asymmetric structure" means that the convex shape or concave shape includes the convex unit shape or concave unit shape which has the cross section of the asymmetric structure.

In this specification, unless mentioned otherwise, the "convex" means a portion having a convex region compared to other portions and the "concave" means a region having the concave shape compared to other portions. For example, a concave virtual region may be formed between two convexes, so that the virtual region may be named as the concave.

In an embodiment of this specification, in a decoration member, at least one of a cross section Z1 acquired by cutting the convex type structure or concave type structure in a first plane; and a cross section Z2 acquired by cutting the convex type structure or concave type structure in a second plane includes the cross section of the asymmetric structure and the first plane may be parallel to the first axis direction and the second plane may parallel to the second axis direction and the first and second planes may include a straight line passing through the highest point of the convex type structure or the lowest point of the concave type structure among normal lines on one surface of the substrate.

In this case, since the cross section appearing in any one or more directions of the convex type structure or the concave type structure includes the cross section of the asymmetric structure, the decoration member may exhibit dichroism in a specific direction. For example, when the cross section Z1 cut by the first plane is the cross section of the asymmetric structure, the decoration member may exhibit dichroism in the first axis direction, and when the cross section Z2 cut in the second plane is the cross section of the asymmetric structure, the decoration member in the second axis direction may exhibit dichroism. In addition, as described above, by adjusting the angle between the first axis direction and the second axis direction, there is an advantage that the direction of dichroism represented by the decoration member may be adjusted.

In an embodiment of this specification, each of the first plane and the second plane may be a virtual plane satisfying the above-described description.

In an embodiment of this specification, the cross section Z1 acquired by cutting the convex type structure or concave type structure in the first plane; and the cross section Z2 acquired by cutting the convex type structure or concave type structure in the second plane may be the same or different from each other, and each of the cross sections may include the convex shape or concave shape having the cross section of the asymmetric structure.

In an embodiment of this specification, the cross section Z1 acquired by cutting the convex type structure or concave type structure in the first plane; and the cross section Z2 acquired by cutting the convex type structure or concave type structure in the second plane may be the same or different from each other, and each of cross sections may include an scalene triangle. A scalene triangle means a triangle having three different side lengths.

In an embodiment of this specification, the cross section Z1 acquired by cutting the convex type structure or concave type structure in the first plane; and the cross section Z2 acquired by cutting the convex type structure or concave type structure in the second plane may be different from each other. For example, the cross section Z1 acquired by cutting the convex type structure or the concave type structure in the first plane may include a triangular shape having both inclination angles of 20 degrees and 70 degrees, respectively and the cross section Z2 acquired by cutting the convex type structure or the concave type structure in the second plane may include a triangular shape having both inclination angles of 10 degrees and 80 degrees.

In an embodiment of this specification, a flat portion may be further included between the convex type structure or the concave type structure. The flat portion may refer to a region in which the convex type structure and the concave type structure are not provided and the description of the convex type structure may be applied to the concave type structure except that the above-described convex type structure is an inverted shape.

In an embodiment of this specification, the convex or concave shape having the cross section of the asymmetric structure that includes two or more sides in which at least one cross section has different inclination angles, different degrees of curvature, or different side shapes. For example, when two sides of sides constituting at least one cross section have different inclination angles, different degrees of curvature, or different side shapes, the convex shape or the concave shape has the asymmetrical structure.

In this specification, unless otherwise indicated, the "side" may be a straight line, but is not limited thereto, and all or a part of sides may be curved. For example, the sides may include a portion of an arc of a circle or ellipse, a wave structure, a structure such as zigzag, and the like. When the side includes a portion of an arc of a circle or an ellipse, the circle or ellipse may have a radius of curvature. The radius of curvature may be defined as a radius of the arc when an extremely short section of the curved line is converted into an arc.

In this specification, unless otherwise indicated, the term "inclined side" means a side of which an angle between the side and the ground is more than 0 degree and 90 degrees or less when the decoration member is placed on the ground. At this time, when the side is a straight line, the angle between the straight line and the ground may be measured. When the side includes a curve line, when the decoration member is placed on the ground, an angle between the straight line connecting a point of the side closest to the ground and a point of the surface furthest from the ground at a shortest distance and the ground may be measured.

In this specification, unless mentioned otherwise, the term "inclined surface" means a surface of which an angle between the surface and the ground is more than 0 degree and 90 degrees or less when the decoration member is placed on the ground. At this time, when the surface is planar, the angle between the plane and the ground may be measured. When the surface includes a curved surface, when the decoration member is placed on the ground, an angle between the straight line linking a point of the surface closest to the ground and a point of the surface furthest from the ground at a shortest distance and the ground may be measured.

In this specification, unless mentioned otherwise, the inclination angle is more than 0 degree and 90 degrees or less as an angle between the surface or side constituting the substrate and the ground, when the decoration member is placed on the ground. Alternatively, the inclination angle may mean an angle formed between the ground and a segment a'-b' generated when connecting a point a' where the surface or side constituting the substrate is in contact with the ground and a point b' where the surface or side constituting the substrate is furthest from the ground to each other.

In this specification, unless otherwise stated, the degree of curvature refers to a degree of change in a slope of a tangent at successive points on the side or surface. The greater the change in the slope of the tangent at successive points on the side or surface, the greater the degree of curvature.

In an embodiment of this specification, the cross section of the asymmetric structure may include a convex shape or a concave shape including a first inclined side and a second inclined side having different inclination angles.

In an embodiment of this specification, a circumference of the cross section of the asymmetric structure is a straight line, a curved line, or a combination thereof.

In an embodiment of this specification, the first inclined side and the second inclined side are the straight line, the curved line, or the combination thereof.

FIG. 6 illustrates that the first inclined side and the second inclined side have a straight line shape. Each convex shape includes a first region D1 including the first inclined side and a second region D2 including the second inclined side. The first inclined side and the second inclined side have straight shapes. An angle c3 between the first inclined side and the second inclined side may be 75 degrees to 105 degrees. An angle c1 between the first inclined side and the ground (substrate) and an angle c2 between the second inclined side and the ground are different from each other. For example, a combination of c1 and c2 may be 20 degrees/80 degrees, 10 degrees/70 degrees or 30 degrees/70 degrees.

FIGS. 7(a)-7(b) illustrate that the shape of the first inclined side or the second inclined side has a curved shape. Each convex shape includes a first region E1 including the first inclined side and a second region E2 including the second inclined side. For example, both the first inclined side and the second inclined side may have curved shapes, the first inclined side may have a straight shape, and the second inclined side may have a curved shape. When the first inclined side has a straight shape and the second inclined side has a curved shape, the angle c1 may be greater than the angle c2. FIGS. 7(a)-7(b) illustrate that the first inclined side has a straight shape, and the second inclined side has a curved shape. The angle between the inclined side having a curved shape and the ground may be calculated from an angle formed by a straight line and the ground when an arbitrary straight line is drawn from a point where the inclined side meets the ground to a point where the first inclined side meets the second inclined side. The second inclined side having the curved shape may have a different degree of curvature according to the height of the substrate and the curved line may have a radius of curvature. The radius of curvature may be 10 times or less larger than the width (E1+E2) of the convex shape. FIG. 7(a) shows that the radius of curvature of the curve line is twice the width of the convex shape, and FIG. 7(b) shows that the radius of curvature of the curved line is one time the width of the convex shape. A ratio of a curvature portion E2 to the width (E1+E2) of the convex may be 90% or less. FIGS. 7(a) and 18(b) show that the ratio of the curvature portion E2 to the width (E1+E2) of the convex is 60%.

In an embodiment of this specification, the cross section of the asymmetric structure may have a polygonal shape of a triangle or quadrangle.

In an embodiment of this specification, the convex shape P1 may be a triangle or have a shape further including a small concavity P3 at a tip (a pointed portion or a vertex portion) of the triangle. FIG. 8 exemplarily illustrates that the concave shape P1 including the concavity P3 is arranged. The convex P1 may have a shape in which a tip (pointed portion) of the convex further includes the concavity P3 smaller in height than the convex. The decoration member may show an effect that an image color is slightly changed depending on the viewing angle.

FIG. 9 illustrates that the convex shape is a quadrangular shape. The quadrangular shape may be a general quadrangular shape, and is not particularly limited as long as the inclination angles of the inclined sides are different from each other. The quadrangular shape may be a form remaining by partially cutting off a triangle. For example, the quadrangular shape may be a quadrangular trapezoid in which a pair of facing sides are parallel to each other, or a quadrangular shape in which a pair of facing sides parallel to each other do not exist. The convex shape includes a first region F1 including a first inclined side, a second region F2 including a second inclined side, and a third region F3 including a third inclined side. The third inclined side may or not be parallel to the ground. For example, when the quadrangular shape is trapezoidal, the third inclined side is parallel to the ground. At least one of the first inclined side to the third inclined side may have a curved shape and the details of the curved shape are as described above. The length of the sum of F1+F2+F3 may be defined as the width of the convex shape, and the details of the width are as described above.

FIG. 10 illustrates a method for determining a convex shape. The convex shape may be a shape acquired by removing a specific region of an ABO1 triangular shape. The method of determining the specific region to be removed is as follows. The contents of inclination angles c1 and c2 are the same as described above.

1) Set any point P1 on an AO1 segment that divides the AO1 segment at a ratio of L1':L2'.
2) Set any point P2 on a BO1 segment that divides the BO1 segment at a ratio of m1':m2'.
3) Set any point O2 on an AB segment that divides the AB segment at a ratio of n1':n2'.
4) Set any point P3 on a o1'o2' segment that divides a O1O2 segment at a ratio of o1':o2'.

In this case, the ratios of L1':L2', m1':m2', n1':n2' and o1':o2' may be the same as or different from each other, and each independently 1:1000 to 1000:1.

5) Remove an area formed by a polygon of P1O1P2P3.
6) Set a shape formed by a polygon of ABP2P3P1 as a cross section of the convex.

The convex shape may be modified in various forms by adjusting the ratios of L1':L2', m1':m2', n1':n2' and o1':o2'. For example, when the L1' and m1' increase, the height of the convex shape may increase, and when the o1' increases, the height of the concave formed on the convex may decrease, and a position of the lowest point of the concave formed in the convex may be adjusted close to either of the inclined sides of the convex by adjusting a ratio of n1'.

When the ratios of L1':L2', m1':m2', and o1':o2' are all the same as each other, the cross section may have a trapezoidal shape (FIG. 11). The heights ha and hb of the trapezoid may be varied by adjusting the ratio of L1':L2'. For example, FIG. 11(a) shows a pattern layer manufactured when the ratio of L1':L2' is 1:1 and FIG. 11(b) shows a pattern layer manufactured when the ratio of L1':L2' is 2:1. In this case, the ratio of m1':m2' is 1:1 and the ratio of o1':o2' is equal to 1:8.

In an embodiment of this specification, an angle formed between the first inclined side and the second inclined side may be in a range of 80 degrees to 100 degrees. Specifically, the angle may be, specifically, 80 degrees or more, 83 degrees or more, 86 degrees or more, or 89 degrees or more, and may be 100 degrees or less, 97 degrees or less, 94 degrees or less, or 91 degrees or less. The angle may refer to an angle of a vertex formed between the first inclined side and the second inclined side. When the first inclined side and the second inclined side do not form a vertex with each other, the angle may mean an angle of a vertex in a state in which a vertex is formed by virtually extending the first inclined side and the second inclined side.

In an embodiment of this specification, a difference in inclination angle between the first inclined side and the second inclined side may be in a range of 30 degrees to 70 degrees. The difference between the inclination angle a2 of the first inclined side and the inclination angle a3 of the second inclined side may be, for example, 30 degrees or more, 35 degrees or more, 40 degrees or more, or 45 degrees or more, and may be 70 degrees or less, 65 degrees or less, 60 degrees or less or 55 degrees or less. When the difference between the inclination angles of the first inclined side and the second inclined side is within the above range, it may be advantageous in terms of implementation of color representation according to a direction.

In an embodiment of this specification, a cross section Z3 taken along a plane formed by the first axis and the second axis of the convex type structure or the concave type structure may be in the form of a square, a rectangle, or a polygon. For example, when the angle between the first axis and the second axis is 90 degrees, and the distance d1 between the highest points of the convex type structures arranged in the first axis direction and the distance d2 between the highest points of the convex type structures arranged in the second axis direction are the same as each other, the cross section Z3 taken along the plane formed by the first axis and the second axis of the convex type structure may be a square.

In an embodiment of this specification, two or more convex type structures having heights different from each other in one of the first and second directions may be included. FIG. 12 illustrates a form in which a cross section of the convex type structure or concave type structure taken along the first plane; or a cross section taken along a second plane is arranged. Specifically, it is shown that a second convex P2 having a smaller height than the convex P1 is arranged between the convexes P1. Hereinafter, the convex named before the second convex may be referred to as a first convex, and the convex named before the second convex shape may be referred to as a first convex shape.

In an embodiment of this specification, a height H2 of the second convex P2 may have a range of ⅕ to ¼ of the height H1 of the first convex P1. For example, a difference (H1−H2) between the heights of the first convex and the second convex may be 10 μm to 30 μm. The width W2 of the second convex may be 1 μm to 10 μm. The width W2 of the second convex may be specifically 1 μm or more, 2 μm or more, 3 μm or more, 4 μm or more, or 4.5 μm or more, and may be 10 μm or less, 9 μm or less, 8 μm or less, 7 μm or less, 6 μm or less, or 5.5 μm or less.

In an embodiment of this specification, the second convex shape may have two inclined surfaces S3 and S4 having different inclination angles. An angle a4 formed between the two inclined surfaces of the second convex shape may be 20 degrees to 100 degrees. Specifically, the angle a4 may be 20 degrees or more, 30 degrees or more, 40 degrees or more, 50 degrees or more, 60 degrees or more, 70 degrees or more, 80 degrees or more, or 85 degrees or more, and may be 100 degrees or less or 95 degrees or less. A difference (a6−a5) between the inclination angles of both inclined surfaces of the second convex may be 0 to 60 degrees. The difference (a6−a5) of the inclination angle may be 0 degrees or more, 10 degrees or more, 20 degrees or more, 30 degrees or more, 40 degrees or more, or 45 degrees or more, and may be 60 degrees or less or 55 degrees or less. When the dimension of the second convex shape is within the above range, it may be advantageous in that the inflow of light is increased on the side surface having a large inclination angle to form a bright color.

In this specification, inclination angles a2 and a3 of the convex P1 may mean angles formed by inclined surfaces S1' and S2' of the convex P1 and a horizontal surface of the substrate. Unless particularly mentioned in this specification, the first inclined surface in the drawing may be defined as the left inclined surface of the convex and the second inclined surface may mean the right inclined surface of the convex.

In an embodiment of this specification, the cross section of the convex shape P1 may have a polygonal shape and a columnar shape extending in one direction.

In an embodiment of this specification, the height H3 of the concavity P3 may be 3 μm to 15 μm. The height H3 of the concavity P3 may be specifically 3 μm or more, and may be 15 μm or less, 10 μm or less, or 5 μm or less. The concave may have two inclined surfaces S5 and S6 having different inclination angles. An angle a7 formed between the two inclined surfaces of the concave may be 20 degrees to 100 degrees. Specifically, the angle a7 may be 20 degrees or more, 30 degrees or more, 40 degrees or more, 50 degrees or more, 60 degrees or more, 70 degrees or more, 80 degrees or more, or 85 degrees or more, and may be 100 degrees or less or 95 degrees or less. A difference (a9−a8) between the inclination angles of both inclined surfaces of the concave may be 0 to 60 degrees. The difference (a9−a8) of the inclination angle may be 0 degrees or more, 10 degrees or more, 20 degrees or more, 30 degrees or more, 40 degrees or more, or 45 degrees or more, and may be 60 degrees or less or 55 degrees or less. When the dimension of the concave is in the above range, it may be advantageous in terms of adding colors on a mirror surface.

In an embodiment of this specification, the convex type structure may be arranged in an inverted structure in one of the first direction and the second direction. FIGS. 13(a)-13(b) exemplarily show such an arrangement structure. As shown in FIG. 13(a), the convex type structures are arranged in an inverted structure of 180 degrees in either of the first direction and the second direction. Specifically, when the convex type structure is arranged in the inverted structure, the convex shape as a cross section of the convex type structure may include a first region C1 in which the second inclined surface has a larger inclination angle than the first inclined surface and a second region C2 in which the second inclined surface has a smaller inclination angle than the first inclined surface. The convex included in the first region may be referred to as the first convex shape P1 and the convex included in the second region may be referred to as a fourth convex shape P4. The contents described in the items of the convex shape P1 may be similarly applied to the heights, the widths, and the inclination angles of the first and fourth convex shapes P1 and P4 and the angle formed by the first and second inclined surfaces. As illustrated in FIG. 13(b), one of the first region and the second region may correspond to an image or a logo, and the other region may correspond to a background part. The decoration member may show an effect that the color of the image or log is slightly changed depending on the viewing angle. Further, the decoration member may show a decoration effect that the colors of the image or the log part and the background part are seen exchanged according to the viewing direction.

In an embodiment of this specification, the heights of the first convex to the fourth convex may be 5 μm to 30 μm.

In an embodiment of this specification, the height of the convex type structure may be 5 μm to 30 μm. If the height of the convex type structure is within the above range, it may be advantageous in terms of production process. In this specification, the height of the convex type structure may mean the shortest distance between the highest portion and the lowest portion of the convex with respect to a horizontal plane of the substrate. In the description relating to the height of the convex, the same numerical range may be applied even to the depth of the concave described above.

In an embodiment of this specification, the width W1 of the convex shape P1 may be 10 μm to 90 μm. If the width of the convex is within the above range, it may be advantageous in terms of process for processing and forming the pattern. The width W1 of the convex P1 may be, for example, 10 μm or more, 15 μm or more, 20 μm or more, or 25 μm or more, and may be 90 μm or less, 80 μm or less, 70 μm or less, 60 μm or less, 50 μm or less, 40 μm or less, or 35 μm or less. Descriptions relating to this width may apply not only to the convexes, but also to the concavities described above.

In an embodiment of this specification, a flat portion may be further included between the convex type structure or the concave type structure two-dimensionally arranged.

In an embodiment of this specification, a flat portion may be further included between the convex or the concave.

In an embodiment of this specification, a width of the flat portion may be 0 μm to 20 μm. The flat portion may be a gap between any one convex type structure or concave type structure and an adjacent convex type structure or concave type structure. This may mean the shortest distance between a point where one convex type structure or concave type structure ends and a point where the other convex type structure or concave type structure starts. If the width of the flat portion is properly maintained, the decoration member should have a relatively bright color when viewed from an inclined surface having a larger inclination angle of the convex, and a phenomenon that the reflection area is dark due to shading may be improved.

In an embodiment of this specification, the convex or concave type structure may be a cone-shaped convex type structure protruding out of the surface of the substrate or a cone-shaped concave type structure recessed inside the surface of the substrate.

In an embodiment of this specification, the cone shape includes a shape of a cone, an elliptical cone, or a pyramid. Here, the shape of the bottom surface of the pyramid includes a triangle, a square, and a star shape having five or more protruding points. According to an example, when the decoration member is placed on the ground, when the surface of the substrate has a cone-shaped convex shape, at least one of vertical cross sections of the convex shape with respect to the ground may have a triangular shape. According to another example, when the decoration member is placed on the ground, when the surface of the substrate has a cone-shaped concave shape, at least one of vertical cross sections of the concave shape with respect to the ground may have an inverse triangular shape.

In an embodiment of this specification, the cone-shaped convex or the cone-shaped concave type structure may have at least one cross section of an asymmetric structure. For example, when the cone-shaped convex or concave is observed from the surface side of the convex or the concave shape, when two or less identical forms exist when rotating 360 degrees from the vertex of the cone, it is advantageous in expressing dichroism. FIG. 14 shows the cone-shaped convex shape observed from the surface side of the convex shape, including cone shapes having a symmetrical structure, and (cone shapes of an asymmetric structure.

When the decoration member is placed on the ground, the cone shape of the symmetrical structure has a regular polygon of which a cross section (hereinafter, referred to as a horizontal cross section) in a direction horizontal to the ground is a circle or a length of each side is the same, and the vertex of the cone is a structure existing on a line perpendicular to the cross section of the center of gravity of the horizontal cross section for the ground. However, when viewed from the surface side of the cone-shaped convex or concave type structure, a cone shape having a cross section of an asymmetric structure is a structure in which a position of the vertex of the cone exists on the vertical line of the point that is not the center of gravity of the horizontal cross section of the cone or a structure in which a horizontal cross section of the cone is a polygon or ellipse of an asymmetric structure. When the horizontal cross section of the cone is a polygon of an asymmetric structure, at least one of sides or angles of the polygon may be designed differently from other sides or angles.

For example, as shown in FIG. 15, the position of the vertex of the cone may be changed. Specifically, as shown in the first picture of FIG. 15, when the vertex of the cone is designed to be located on the vertical line of the center 01 of gravity of the horizontal cross section with respect to the ground of the cone when observed from the surface side of the con-shaped convex type structure, four identical structures may be obtained when rotating at 360 degrees based on the vertex of the cone (4 fold symmetry). However, the symmetrical structure is broken by designing the vertices of the cone at a position 02 other than the center 01 of gravity of the horizontal cross section with respect to the ground. When a length of one side of the horizontal cross section with respect to the ground is x, moving distances of vertexes of the cone are a and b, a height of the cone shape which is a length of the line connected vertically from the vertex 01 or 02 of the cone to the horizontal cross section with respect to the ground is h, and an angle formed between the horizontal cross section and the side surface of the cone is θn, a cosine value may be obtained as described below with respect to surfaces 1, 2, 3 and 4 of FIG. 15.

$$\cos(\Theta 1) = \frac{\left(\frac{x}{2}\right)}{\mathrm{sqrt}\left(h^2 + \left(\frac{x}{2}\right)^2\right)} \quad \cos(\Theta 3) = \frac{\left(\frac{x}{2} - a\right)}{\mathrm{sqrt}\left(h^2 + \left(\frac{x}{2} - a\right)^2\right)}$$

$$\cos(\Theta 2) = \frac{\left(\frac{x}{2}\right)}{\mathrm{sqrt}\left(h^2 + \left(\frac{x}{2}\right)^2\right)} \quad \cos(\Theta 4) = \frac{\left(\frac{x}{2} - b\right)}{\mathrm{sqrt}\left(h^2 + \left(\frac{x}{2} - b\right)^2\right)}$$

At this time, since θ1 and θ2 are the same, there is no dichroism. However, since θ3 and θ4 are different from each other, and |θ3−θ4| means a color difference ΔE*ab between two colors, dichroism may be exhibited. Here, |θ3−θ4|. As such, by using the angle between the horizontal cross section and the side surface of the ground of the cone, it is possible to quantitatively indicate how the symmetrical structure is broken, that is, the degree of asymmetry, and the numerical value representing the degree of asymmetry is proportional to the color difference of the dichroism.

In addition to the structure illustrated above, convex or concave type structures having various convex or concave-shaped cross sections as shown in FIGS. 16(a)-16(i) may be implemented.

In an embodiment of this specification, the substrate additionally includes a pattern of a symmetrical structure. The symmetrical structure includes a prismatic structure, a lenticular lens structure, and the like.

In an embodiment of this specification, the substrate has a flat portion on an opposite surface to the surface with the convex type structure or the concave type structure. A plastic substrate may be used as the substrate. Examples of the plastic substrate may include triacetyl cellulose (TAC); cyclo olefin copolymer (COP) such as norbornene derivatives; poly(methyl methacrylate) (PMMA); polycarbonate (PC); polyethylene (PE); polypropylene (PP); polyvinyl alcohol (PVA); diacetyl cellulose (DAC); polyacrylate (Pac); poly ether sulfone (PES); polyetheretherketon (PEEK); polyphenylsulfone (PPS), polyetherimide (PEI); polyethylenenaphthatlate (PEN); polyethyleneterephtalate (PET); polyimide (PI); polysulfone (PSF); polyarylate (PAR) or an amorphous fluorine resin, etc., but are not limited thereto.

In an embodiment of this specification, a color dye may be further included inside or on at least one surface of the substrate.

In an embodiment of this specification, the color dye may include anthraquinone-based dyes, phthalocyanine-based dyes, thioindigo-based dyes, perinone-based dyes, isoxindigo-based dyes, methane-based dyes, monoazo-based dyes, and 1:2 metal complex-based dyes.

In an embodiment of this specification, when the substrate includes a color dye therein, a scheme of adding a dye to the curable resin may be applied. When a color dye is further included in the lower portion of the substrate, a scheme of coating a layer containing the dye on the upper or lower portion of the substrate may be applied.

In an embodiment of this specification, the content of the color dye may be, for example, 0 to 50 wt %. The content of the color dye may determine the transmittance and haze range of the substrate and the decoration member, the transmittance may be, for example, 20% to 90%, and the haze may be, for example, 1% to 40%.

In an embodiment of this specification, the decoration layer includes an inorganic layer provided on the substrate, and the inorganic layer may be a single layer or multiple layers including one or two or more types of materials selected from the group consisting of indium (In), titanium (Ti), and tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au), and silver (Ag) and one or two or more types of materials selected from the group consisting of an oxide, a nitride, or an oxynitride thereof and carbon and a carbon composite.

In this specification, the inorganic layer may have the same convex or concave as the surface of the convex type structure or concave type structure of the substrate described above.

In an embodiment of this specification, the inorganic layer may have the same slope as the surface of the substrate described above.

In an embodiment of this specification, the inorganic layer may have the same convex or concave type structure as the surface of the substrate described above. The inorganic layer may have the same slope as the surface of the substrate described above.

In an embodiment of this specification, the inorganic layer may have a refractive index of 0 to 8 for light having a wavelength of 400 nm. When the refractive index of the inorganic layer is out of the range, the reflected light decreases to be dark and the case may not be appropriate. The refractive index of the inorganic layer may be specifically 0 or more, 1 or more, 2 or more, 3 or more, 4 or more, or 4.5 or more, and may be 8 or less, 7 or less, 6 or less, or 6.5 or less.

In an embodiment of this specification, the inorganic layer may have a thickness of, for example, 10 nm to 1 μm. When the thickness of the inorganic layer is within the above range, it may be advantageous to provide a decoration member having dichroism showing a different color depending on the viewing direction and improving the dichroic visibility. The inorganic layer may have a thickness of, for example, 10 nm or more, 50 nm or more, or 100 nm or more, and may be 1 μm or less, 800 nm or less, 600 nm or less, 400 nm or less, or 300 nm or less. The decoration member may exhibit dichroism showing different colors depending on the viewing direction. The decoration member may improve the dichroic visibility by modifying the surface shape of the substrate.

In an embodiment of this specification, the inorganic layer may impart a metallic texture and a depth effect of color when viewing the decoration member. The inorganic layer may be displayed in various colors according to a viewing angle of an image of the decoration member. This is because a wavelength of light passing through the substrate and reflected from the surface of an inorganic layer is changed according to a wavelength of the incident light.

In an embodiment of this specification, the inorganic layer includes a light absorption layer and a light reflection layer sequentially provided on the substrate, or includes a light reflection layer and a light absorption layer sequentially provided on the substrate.

In this specification, the light absorption layer and the light refection layer are named according to functions thereof. In regard to light having a specific wavelength, a layer that reflects light relatively much may be represented by the light reflection layer and a layer that reflects light relatively little may be represented by the light absorption layer.

Through FIG. 17, the light absorption layer and the light reflection layer will be described. In the decoration member of FIG. 17, each layer is laminated in the order of an $L_{i-1}$ layer, an $L_i$ layer, and an $L_{i-1}$ layer based on a light input direction, and an interface $I_i$ is positioned between the $L_{i-1}$ layer and the $L_i$ layer and an interface is located between the $L_i$ layer and the $L_{i+1}$ layer. When irradiating light having a specific wavelength in a direction perpendicular to each layer so that thin film interference does not occur, the reflectance at the interface $I_i$ may be expressed by Equation C below.

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \qquad \text{[Equation C]}$$

In Equation C, $n_i(\lambda)$ denotes a refractive index according to a wavelength $\lambda$ of an i-th layer and $k_i(\lambda)$ denotes an extinction coefficient according to the wavelength $\lambda$ of the i-th layer. The extinction coefficient is a measure that may define how strongly a target material absorbs light at a specific wavelength, and the definition is described above.

By applying Equation C above, when a sum of the reflectances for each wavelength at the interface $I_i$ calculated at each wavelength is represented by $R_i$, the $R_i$ is represented by Equation D below.

$$R_i = \frac{\sum_{\lambda=380\,nm}^{\lambda=780\,nm} \frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \Delta\lambda}{\sum_{\lambda=380\,nm}^{\lambda=780\,nm} \Delta\lambda} \qquad \text{[Equation D]}$$

In this case, when $R_i$ of $I_i$ is the largest among the interfaces of the laminate, the layer that is in contact with the interface $I_i$ and faces the interface $I_i$ and the direction in which light enters may be defined as a light reflection layer and the remaining layer may be defined as a light absorption layer. For example, in the laminate shown in FIG. 17, when the sum of the reflectances for each wavelength of the interface $I_{i+1}$ is the largest, a layer $L_{i+1}$ which is in contact with $I_{i+1}$ and faces the interface $I_{i+1}$ and the direction in which light enters may be defined as a light reflection layer, and the remaining layers $L_{i-1}$ layer and $L_i$ layer may be defined as a light absorption layer.

The light is absorbed on an incident path and a reflection path of the light in the light absorption layer and further, the light is reflected on each of the surface of the light absorption layer and the interface between the light absorption layer and the light reflection layer and two reflected light is constructively supplemented or destructively interfered. In this specification, the light reflected from the surface of the light absorption layer may be represented by surface reflected light and the light reflected from the interface between the light absorption layer and the light reflection layer may be represented by interface reflected light. FIG. 18 is a schematic diagram of such an operation principle. FIG. 18 illustrates a structure in which the substrate 101, the light reflection layer 201, and the light absorption layer 301 are stacked in this order, but the substrate is located below the light reflection layer, but is not essential.

The light reflected from the surface of the light absorption layer may be represented by surface reflected light and the light reflected from the interface between the light absorption layer and the light reflection layer may be represented by interface reflection light.

In an embodiment of this specification, a refractive index n of the light absorption layer at a wavelength of 400 nm may be preferably in the range of 0 to 8, and in the range of 0 to 7, in the range of 0.01 to 3, and in the range of 2 to 2.5. The refractive index n may be calculated as $\sin\theta_1'/\sin\theta_2'$ ($\theta_1'$ represents an angle of light incident on the surface of the light absorption layer and $\theta_2'$ represents an angle of refraction of light inside the light absorption layer).

In an embodiment of this specification, the extinction coefficient k of the light absorption layer at the wavelength of 400 nm may be in the range of more than 0 and 4 or less and preferably in the range of 0.01 to 4 and in the range of 0.01 to 3.5, in the range of 0.01 to 3, and in the range of 0.1 to 1. The extinction coefficient k represents $-\lambda/4\pi I$ $(dI/dx)$ (where the extinction coefficient represents a path unit length dx in the light absorption layer, for example, a value acquired by multiplying a reduction fraction dI/I of light intensity per meter by $\lambda/4\pi$, where $\lambda$ represents the wavelength of light).

In an embodiment of this specification, the extinction coefficient k of the light absorption layer at a wavelength of 380 nm to 780 nm may be in the range of more than 0 and 4 or less and preferably in the range of 0.01 to 4 and in the range of 0.01 to 3.5, in the range of 0.01 to 3, and in the range of 0.1 to 1. Since the extinction coefficient k is in the range in an entire visible light wavelength range of 400 nm or preferably 380 nm to 780 nm, the entire visible light wavelength range of 400 nm or preferably 380 nm to 780 nm may serve as the light absorption layer within a visible light range.

Even if having the same refractive index (n) value, when the extinction coefficient k value is 0 and the extinction coefficient k value is 0.01 at 380 to 780 nm, the difference may be $\Delta E^*ab = \sqrt{[(\Delta L)^2 + (\Delta a)^2 + (\Delta b)^2]} > 1$. For example, when simulating a case of irradiating D65 (solar spectrum) as a light source to the laminated structure of glass/aluminum/aluminum oxide/air layer, $\Delta E^*ab$ when k value of the aluminum oxide is 0 and 0.01 is obtained as shown in Table 2 below. At this time, the thickness h1 of the aluminum layer is 120 nm, and the thickness h2 of the aluminum oxide layer is shown in Table 2 below. The k value was arbitrarily set to 0 and 0.01 for the simulation, and the n value adopted the aluminum value.

TABLE 2

| h2 [nm] | k = 0 | | | k = 0.01 | | | |
|---|---|---|---|---|---|---|---|
| | L* | a* | b* | L* | a* | b* | ΔE*ab |
| 40 | 6.63 | 1.75 | −1.25 | 85.18 | 2.09 | 0.03 | 1.96 |
| 60 | 9.83 | −4.02 | −8.30 | 87.86 | −4.06 | −9.01 | 2.10 |
| 80 | 5.60 | −1.87 | −2.58 | 94.44 | −2.05 | −2.86 | 1.20 |

In an embodiment of this specification, the light absorption layer may be constituted by a single layer or two layers or more of multiple layers. The light absorption layer may be made of a material having an extinction coefficient k at a wavelength of 380 to 780 nm, that is, a material having an extinction coefficient greater than 0 and 4 or less, preferably 0.01 to 4. For example, the light absorption layer may include one or two or more selected from a group consisting of metal, metalloid, and oxide, nitride, oxynitride, and carbide of the metal or the metalloid. The oxide, nitride, oxynitride, or carbide of the metal or the metalloid may be formed by a deposition condition set by those skilled in the art, etc. The light absorption layer may include the same metal, metalloid, two or more alloys or oxynitrides as the light reflection layer. In an embodiment of this specification, the light absorption layer is a single layer or a multiple layer including one or two or more types of materials selected from indium (In), titanium (Ti), and tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au), and silver (Ag) and one or two or more types of materials selected from the group consisting of an oxide, a nitride, or an oxynitride thereof and carbon and a carbon composite.

In an embodiment of this specification, the light absorption layer includes silicon (Si) or germanium (Ge). The light absorption layer made of silicon (Si) or germanium (Ge) may have a refractive index n of 0 to 8 and 0 to 7 at a wavelength of 400 nm and an extinction coefficient k of greater than 0 and 4 or less, preferably 0.01 to 4, and 0.01 to 3 or 0.01 to 1.

In an embodiment of this specification, the light absorption layer may be made of a material having an extinction coefficient k at a wavelength of 400 nm, preferably 380 to 780 nm, for example, the light absorption layer/light reflection layer may be made of a material such as CuO/Cu, CuON/Cu, CuON/Al, AlON/Al, AlN/Al/AlON/Cu, AlN/Cu, or the like.

The material of the light reflection layer is not particularly limited as long as the material is a material capable of reflecting light, but the light reflectance may be determined according to the material, and for example, the color is easily implemented at 50% or more. The light reflectance may be measured using an ellipsometer.

In an embodiment of this specification, the light reflection layer may be a metal layer, a metal oxide layer, a metal oxynitride layer, or an inorganic layer. The light reflection layer may be constituted by a single layer or constituted by two layers or more of multiple layers.

As an example, the light reflection layer may be a single layer or multiple layers including one or two types or more of materials selected from the group consisting of indium (In), titanium (Ti), and tin (Sn), silicon (Si), germanium (Ge), aluminum (Al), copper (Cu), nickel (Ni), vanadium (V), tungsten (W), tantalum (Ta), molybdenum (Mo), neodymium (Nb), iron (Fe), chromium (Cr), cobalt (Co), gold (Au), and silver (Ag) and one or two types or more of materials of an oxide, a nitride, or an oxynitride thereof and carbon and a carbon composite.

For example, the light reflection layer may include two or more alloys selected from the above materials, and oxides, nitrides or oxynitrides thereof. For example, the light reflection layer may include two or more alloys selected from the metals. More specifically, the light reflection layer may include molybdenum, aluminum or copper. In an embodiment of this specification, the light reflection layer is manufactured by using an ink including carbon or a carbon composite to implement a high resistance reflection layer. The carbon or carbon composite includes carbon black, CNT, and the like. The ink including the carbon or carbon composite material may include the above-described material or an oxide, nitride, or oxynitride thereof and include, for example, one or two or more types of oxides selected from the group consisting of indium (In), titanium (Ti), and tin (Sn), silicon (Si), germanium (Ge), aluminum (Al), copper (Cu), nickel (Ni), vanadium (V), tungsten (W), tantalum (Ta), molybdenum (Mo), neodymium (Nb), Iron (Fe), chromium (Cr), cobalt (Co), gold (Au), and silver (Ag). A curing process may be additionally performed after printing the ink including the carbon or carbon composite.

When the light reflection layer includes two types or more of materials, two or more kinds of materials may be formed by one process, for example, a deposition or printing method, but a method for first forming the layer with one or more kinds of materials and then additionally forming the layer thereon with one or more kinds of materials may be used. For example, the layer is formed by depositing indium or tin and then the ink including the carbon is printed and then cured, thereby forming the light reflection layer. The ink may additionally include oxide such as titanium oxide or silicon oxide.

According to an embodiment, the light absorption layer may have a thickness of 5 to 500 nm, for example, 30 to 500 nm.

In an embodiment of this specification, the thickness of the light reflection layer may be determined according to a desired color in a final structure, and for example, may be 1 nm or more, preferably 25 nm or more, for example, 50 nm or more, preferably 70 nm or more.

In an embodiment of this specification, the light absorption layer may exhibit various shapes by adjusting a deposition condition and the like when forming the light absorption layer.

In an embodiment of this specification, the light absorption layer includes two or more points having different thicknesses.

In an embodiment of this specification, the light absorption layer includes two or more regions having different thicknesses.

In an embodiment of this specification, the light absorption layer may include an inclined surface.

The example of the structure of the light absorption layer according to the embodiment is illustrated in FIGS. 19 and 20. FIGS. 19 and 20 illustrate a structure in which the light reflection layer 201 and the light absorption layer 301 are laminated (not illustrated). According to FIGS. 19 and 20, the light absorption layer 301 has two or more points having different thicknesses. According to FIG. 20, the thicknesses of the light absorption layer 301 at points A and B are different from each other. According to FIG. 21, the thicknesses of the light absorption layer 301 at region C and region D are different from each other.

In an embodiment of this specification, the light absorption layer includes at least one region in which a top surface has an inclined surface having an inclination angle greater than 0 degree and 90 degrees or smaller and the light absorption layer includes at least one region having a thickness different from a thickness in a region having any one inclined surface. In regard to the inclined surface, an angle formed by any one straight line included in the top surface of the light absorption layer and a straight line parallel to the light reflection layer may be defined as the inclined surface. For example, the inclination angle of the top surface of the light absorption layer of FIG. 19 may be approximately 20 degrees.

A surface characteristic such as the gradient of the top surface of the light reflection layer may be the same as that of the light absorption layer. For example, by using the deposition method at the time of forming the light absorption layer, the top surface of the light absorption layer may have the same gradient as the top surface of the light reflection layer. However, the gradient of the top surface of the light absorption layer of FIG. 19 is different from the gradient of the top surface of the light reflection layer.

A structure of the decoration member having the light absorption layer in which the top surface has the inclined surface is illustrated in FIG. 21. In a structure in which the substrate 101, the light reflection layer 201, and the light absorption layer 301 are laminated, a thickness t1 in region E of the light absorption layer 301 and a thickness t2 in region F are different from each other.

FIG. 22 illustrates a light absorption layer having a structure in which inclined surfaces facing each other, i.e., cross sections have a triangular shape. As illustrated in FIG. 22, in the structure of a pattern having the inclined surfaces facing each other, the thicknesses of the light absorption layer on two surfaces having a triangular structure may be different from each other even though the deposition is performed under the same condition. As a result, a light absorption layer having two or more regions with different thicknesses may be formed only by one process. Accordingly, an expression color varies depending on the thickness of the light absorption layer. In this case, when the thickness of the light reflection layer is a predetermined value or more, the thickness does not affect the color change.

In FIG. 22, a structure in which the substrate 101 is provided on the light reflection layer 201 is illustrated, but this specification is not limited to such a structure and the position of the substrate 101 may be disposed at a different position therefrom as described above.

Further, a surface of the substrate 101 of FIG. 21 contacting the light reflection layer 201 is a flat surface, but a surface of the substrate 101 contacting the light reflection layer 201 of the substrate 101 may have a pattern having the same slope as the top surface of the light reflection layer 201. This is illustrated in FIG. 22. In this case, there may be a difference even in thickness of the light absorption layer due to the difference in slope of the pattern of the substrate. However, this specification is not limited thereto and even though the substrate and the light absorption layer are made to have different slopes by using a different deposition method, dichroism to be described below may be exhibited by differentiating the thicknesses of the light absorption layer at both sides of the pattern.

In an embodiment of this specification, the light absorption layer includes one or more regions in which the thickness gradually changes. In FIG. 23, a structure in which the thickness of the light absorption layer 301 gradually changes is illustrated.

In an embodiment of this specification, the light absorption layer includes at least one region in which the top surface has an inclined surface having an inclination angle greater than 0 degree and 90 degrees or smaller and at least one region having the inclined surface has a structure in which the thickness of the light absorption layer gradually changes. The structure of the light absorption layer including the region in which the top surface has the inclined surface is illustrated in FIG. 23. Both regions G and H of FIG. 23 have a structure in which the top surface of the light absorption layer has the inclined surface and the thickness of the light absorption layer gradually changes.

In this specification, the structure in which the thickness of the light absorption layer changes means that the cross section in the thickness direction of the light absorption layer includes a point where the thickness of the light absorption layer is smallest and a point where the thickness of the light absorption layer is largest and the thickness of the light absorption layer increases according to a direction of the point where the thickness of the light absorption layer is smallest to the point where the thickness of the light absorption layer is largest. In this case, the point where the thickness of the light absorption layer is smallest and the point where the thickness of the light absorption layer is largest may mean any point on the interface between the light absorption layer and the light reflection layer.

In an embodiment of this specification, the light absorption layer may include a first region having a first inclined surface in which the inclination angle is in the range of 1 to 90 degrees and may further include two or more regions in which the top surface has an inclined surface having a different inclination direction from the first inclined surface or a different inclination angle from the first inclined surface or the top surface is horizontal. In this case, the thicknesses of the light absorption layer in the first region and the two or more regions may be all different from each other.

In an embodiment of this specification, the decoration member further includes a color film provided between the substrate and the inorganic layer, on an opposite surface to a surface of the substrate facing the inorganic layer, or on an opposite surface to the surface of the inorganic layer facing the substrate.

In an embodiment of this specification, the decoration member further includes a color film provided between the substrate and the inorganic layer, between the light absorption layer and the light reflection layer, on an opposite surface to a surface of the substrate facing the inorganic layer, or on an opposite surface to the surface of the inorganic layer facing the substrate.

If the color film is a film in which a color difference ΔE*ab which is a distance in a space of L*a*b* on the color coordinates CIE L*a*b* of the color expression layer exceeds 1 when the color film exists as compared with a case where the color film is not provided, the color film is not particularly limited.

The color may be represented by CIE L*a*b* and the color difference may be defined using a distance ΔE*ab in the L*a*b*space. Specifically, $\Delta E^*ab=\sqrt{(\Delta L)^2+(\Delta a)^2+(\Delta b)^2}$] and an observer may not recognize the color difference within the range of 0<ΔE*ab<1 [Reference Document: Machine Graphics and Vision 20(4):383-411]. Accordingly, in this specification, the color difference depending on the addition of the color film may be defined as ΔE*ab>1.

By further providing such a color film, even when the material and thickness of the inorganic layer such as the light reflection layer and the light absorption layer are determined, the width of the color that can be realized can be further increased. The color change width according to the addition of the color film may be defined as a color difference (ΔE*ab), which is a difference in L*a*b* before and after applying the color film.

FIGS. 24(a)-24(e) illustrate arrangement positions of the color film. (However, not illustrating the convex type structure and concave type structure on the surface of the substrate 101 and the protective layer)

FIG. 24(a) illustrates a structure in which a color film 401 is provided on the opposite surface of the light absorption layer 301 to the reflection layer 201, FIG. 24(b) illustrates a structure in which the color film 401 is provided between the light absorption layer 301 and the light reflection layer 201, FIG. 24(c) illustrates a structure in which the color film 401 is provided between the light reflection layer 201 and the substrate 101, and FIG. 24(d) illustrates a structure in which the color film 401 is provided on the opposite surface of the substrate 101 to the light reflection layer 201. FIG. 24(e) illustrates a structure in which color films 401a, 401b, 401c, and 401d are provided on the opposite surface of the light absorption layer 310 to the light reflection layer 201, between the light absorption layer 301 and the light reflection layer 201, between the light reflection layer 201 and the substrate 101, and on the opposite surface of the substrate 101 to the light reflection layer 201 and the present invention is not limited thereto and one to three may be omitted among the color films 401a, 401b, 401c, and 401d.

According to another exemplary embodiment of this specification, the arrangement positions of the color film in the structure in which the light reflection layer 301 and the light absorption layer 201 are sequentially provided on the substrate 101 are illustrated in FIGS. 25(a)-25(e) (omitting the convex type structure on the surface of the substrate 101).

FIG. 25(a) illustrates a structure in which the color film 401 is provided on the opposite surface of the substrate 101 to the light absorption layer 301, FIG. 25(b) illustrates a structure in which the color film 401 is provided between the substrate 101 and the light absorption layer 301, FIG. 25(c) illustrates a structure in which the color film 401 is provided between the light absorption layer 301 and the light reflection layer 201, and FIG. 25(d) illustrates a structure in which the color film 401 is provided on the opposite surface of the light reflection layer 201 to the light absorption layer 301. FIG. 25(e) illustrates a structure in which color films 401a, 401b, 401c, and 401d are provided on the opposite surface of the substrate 101 to the light absorption layer 310, between the substrate 101 and the light absorption layer 301, between the light absorption layer 301 and the light reflection layer 201, and on the opposite surface of the light reflection layer 201 to the light absorption layer 301 and the present invention is not limited thereto and one to three may be omitted among the color films 401a, 401b, 401c, and 401d.

In the structures illustrated in FIGS. 24(b) and 25(c), when visible light transmittance of the color film is greater than 0%, the light reflection layer may reflect light incident through the color film, thereby implementing the color by laminating the light absorption layer and the light reflection layer.

In the structures illustrated in FIGS. 24(c), 24(d), and 25(d), the light transmittance of the color expressed from the color film of the light reflection layer 201 is 1% or more, preferably 3% or more, and more preferably 5% or more so as to recognize a color difference change due to the addition of the color film. The reason is that the transmitted light may be mixed with the color by the color film in the range of the visible light transmittance.

The color film may be provided in a state in which one sheet or two or more homogeneous or heterogeneous sheets are laminated.

The color film may be used in combination with the color expressed from the laminated structure of the light reflection layer and the light absorption layer described above to express a desired color. For example, a color film in which one or two or more of pigments and dyes are dispersed in a matrix resin and exhibit the color may be used. The color film as described above may be formed by coating a color film forming composition directly to a position where the color film may be provided or there may be used a method for coating the color film forming composition on a separate substrate, or arranging or attaching the color film at the position where the color film may be provided after preparing the color film by using a known molding method such as casting, extrusion, or the like. The coating method may adopt wet coating or dry coating.

Pigments and dyes that may be included in the color film may be selected from those known in the art so as to achieve a desired color from the final decoration member, and may adopt one or two or more among red, yellow, purple, blue, pink series pigments and dyes. Specifically, dyes including a perinone-based red dye, an anthraquinone-based red dye, a methine-based yellow dye, an anthraquinone-based yellow dye, an anthraquinone-based violet dye, a phthalocyanine-based blue dye, a thioindigo-based pink dye, and an isoxindigo-based pink dye may be used alone or in combination. Pigments including carbon black, copper phthalocyanine (C.I. Pigment Blue 15:3), C.I. Pigment Red 112, Pigment blue, and Isoindoline yellow may be used alone or in combination. As the dye or pigment as described above, commercially available dyes or pigments may be used, and materials such as Ciba ORACET Co., Ltd. and Chokwang Paint Co., Ltd. may be used. The types of dyes or pigments and colors of the dyes or pigments are only examples, and various known dyes or pigments may be used, thereby implementing more various colors.

As the matrix resin included in the color film, materials known as materials such as a transparent film, a primer layer, an adhesive layer, and a coating layer may be used, and are not particularly limited thereto. For example, various materials including acrylic resins, polyethylene terephthalate resins, urethane resins, linear olefin resins, cycloolefin resins, epoxy resins, triacetyl cellulose resins, and the like may be selected, and copolymers of the above exemplified materials or mixtures may also be used.

When the color film is disposed closer to the position for observing the decoration member than the light reflection layer or the light absorption layer, for example, in the structures illustrated in FIGS. 24(a) and 24(b), FIGS. 25(a), 25(b), and 25(c), the light transmittance of the color expressed from the light reflection layer, the light absorption layer, or a lamination structure of the light reflection layer and the light absorption layer in the color film is 1% or more, preferably 3% or more, and more preferably 5% or more. Accordingly, the color expressed from the color film and the color expressed from the light reflection layer, the light absorption layer, or the lamination structure thereof are together combined to achieve the desired color.

The thickness of the color film is not particularly limited, and if the desired color may be represented, one of those skilled in the art may select and set the thickness. For example, the thickness of the color film may be 500 nm to 1 mm.

Exemplary decoration members and methods of manufacturing the decoration members may be applied to a known object requiring the application of the decoration member. For example, the present invention may be applied to portable electronic devices, electronic products, cosmetic containers, furniture, building materials, and the like without limitation.

In an embodiment of this specification, the decoration member has dichroism of $\Delta E^*ab > 1$.

In an embodiment of this specification, the decoration member further includes at least one layer selected from the group consisting of a color expression layer, a scattering layer, a protective layer, an adhesive layer, and a bonding layer on at least one of a surface facing the decoration layer of the substrate; or the surface facing the substrate of the decoration layer.

In an embodiment of this specification, the color expression layer may include at least one of organic dyes, inorganic dyes and pigments.

In an embodiment of this specification, the color expression layer may have a light absorption or fluorescence characteristic in the wavelength range of 380 nm to 780 nm.

In an embodiment of this specification, the color expression layer may have a transmittance of 50% or less in the wavelength range of 380 nm to 780 nm.

In an embodiment of this specification, the color expression layer may have a thickness of 10 μm or more and 500 μm or less, 50 μm or more and 300 μm or less, or 100 μm or more and 200 μm or less.

In an embodiment of this specification, the scattering layer may further include particles made of an organic material or an inorganic material.

In an embodiment of this specification, the particles included in the scattering layer may have a spherical or amorphous shape.

In an embodiment of this specification, the maximum diameter of the particles included in the scattering layer may be 1 nm or more and 900 μm or less, preferably 10 nm or more and 100 μm or less, and more preferably 200 nm or more and 10 μm or less.

In an embodiment of this specification, the scattering layer may uniformly reflect some or all of the incident light in all directions.

The adhesive layer may use an optically clear adhesive tape (OCA tape) or an adhesive resin. As the OCA tape or the adhesive resin, OCA tapes or adhesive resins known in the art may be applied without limitation. If necessary, a release liner for protecting the adhesive layer may be further provided.

In an embodiment of this specification, the decoration member may be a decoration film; or a case of a mobile device or an electronic product.

In an embodiment of this specification, the convex or concave type structure may be manufactured by forming a pattern on an UV curable resin and curing the pattern using ultraviolet light, or may be performed by a laser processing method.

The material of the convex or concave type structure is not particularly limited, and when the inclined surface or the three-dimensional structure is formed by the above method, UV curable resins known in the art may be used.

A protective layer may be further provided on the light absorbing layer.

In this specification, although a deposition such as a sputtering method is mentioned as an example of a method of forming a light reflection layer and a light absorption layer, various methods of manufacturing a thin film may be applied as long as the method may have configurations and characteristics according to the embodiments described in this specification. For example, evaporation deposition, chemical vapor deposition (CVD), wet coating, or the like may be used.

EXAMPLES

Hereinafter, the present invention will be described in more detail with reference to Examples below. However, the following Examples are used just for exemplifying the present invention and not used for defining the scope of the present invention.

Examples and Comparative Examples

Example 1 (Film #1)

An ultraviolet curable resin was applied on a PET substrate to form a convex type structure arranged 2-dimensionally. Each pattern was arranged two-dimensionally, and the angle formed by the arranged first and second directions was 90 degrees.

When the side surfaces of the patterns were observed in the first direction and the second direction, it was observed that the triangular convex shapes having the inclination angles of 20 degrees/70 degrees were repeatedly arranged.

Thereafter, an inorganic layer including a light absorption layer and a light reflection layer was formed on the convex type structure by using reactive sputtering. Specifically, a CuO light absorption layer was formed on the pattern layer, and 70 nm thick In was deposited on the formed light absorption layer by a sputtering scheme to form the light reflection layer, thereby preparing a final decoration member. In addition, a schematic diagram of a form in which the convex type structure is arranged is illustrated in FIG. 26 and the three-dimensional appearance of the convex type structure is illustrated in FIG. 27.

Example 2 (Film #2)

The decoration member was prepared in the same method as Example 1 except that the inorganic layer is a five-layer thin film inorganic layer of $TiO_2$ (thickness 50 nm), $SiO_2$ (thickness 100 nm), $TiO_2$ (thickness 100 nm), indium (thickness 30 nm), and $TiO_2$ (thickness 20 nm).

Example 3 (Film #3)

The decoration member was prepared in the same method as Example 1 except that when the side surface of each pattern was observed in the first direction and the second direction, a triangular cross section having an inclination angle of 20 degrees/60 degrees was observed and an inorganic layer made of copper oxynitride (CuON) is deposited on the block type structure by reactive sputtering.

Example 4 (Film #4)

The decoration member was prepared in the same method as Example 2 except that the shape of the pattern is a prism shape having a triangular cross section of 20 degrees/70 degrees.

Example 5 (Film #5)

An ultraviolet curable resin was applied on a PET substrate to form the pattern layer arranged two-dimensionally. Each pattern was arranged two-dimensionally, and the angle formed by the arranged first and second directions clockwise was 45 degrees.

When the side surfaces of the patterns were observed in the first direction and the second direction, a triangular cross section having the inclination angles of 20 degrees/70 degrees was observed.

The decoration member was prepared by forming a final decoration layer by depositing the inorganic layer made of copper oxynitride on the pattern layer by using the reactive sputtering.

In addition, a schematic diagram of a form in which the convex type structure is arranged is illustrated in FIG. 28 and the three-dimensional appearance of the convex type structure is illustrated in FIG. 29.

Example 6 (Film #6)

An ultraviolet curable resin was applied on the PET substrate to form the pattern layer arranged two-dimensionally. Each pattern was arranged two-dimensionally, and the angle formed by the arranged first and second directions clockwise was 135 degrees.

When the side surfaces of the patterns were observed in the first direction and the second direction, a triangular cross section having the inclination angles of 20 degrees/70 degrees was observed.

The decoration member was prepared by forming a final decoration layer by depositing the inorganic layer made of copper oxynitride on the pattern layer by using the reactive sputtering.

Comparative Example 1 (Film #7)

The decoration member was prepared in the same method as Example 1 except that a mirror-shaped decoration layer was formed by thermally depositing aluminum metal other than the inorganic layer of Example 1 on the pattern layer.

Comparative Example 2 (Film #8)

The decoration member was prepared by forming the final decoration layer by depositing the inorganic layer made of aluminum oxynitride on the PET substrate without a flat-shaped pattern by using the reactive sputtering.

Comparative Example 3 (Film #9)

A colloidal absorption layer one-dimensional pattern film having a rectangular cross section having a pitch of 100 μm, a fill factor of 50%, and a height of 50 μm was prepared. In this case, the fill factor is a ratio of an area filled with a colloidal absorption layer of a total pitch 100 μm.

Comparative Example 4 (Film #10)

A colloidal absorption layer two-dimensional pattern film having a rectangular cross section having a pitch of 100 μm, a fill factor of 25%, and a height of 50 μm was prepared. In this case, the fill factor is a ratio of an area filled with a colloidal absorption layer of a total pitch 100 μm.

Comparative Example 5 (Film #11)

An ultraviolet curable resin was applied on the PET substrate to form the pattern layer arranged two-dimensionally. Each pattern was arranged two-dimensionally, and the angle formed by the arranged first and second directions was 90 degrees.

When the side surfaces of the patterns were observed in the first direction and the second direction, a triangular cross section having the inclination angles of 20 degrees/70 degrees was observed.

The decoration member was prepared by forming the final decoration layer by depositing a three-layer thin film inorganic layer of $TiO_2$ (thickness 50 nm), $SiO_2$ (thickness 100 nm), and $TiO_2$ (thickness 100 nm) on the pattern layer by using the reactive sputtering.

Comparative Example 6 (Film #12)

An ultraviolet curable resin was applied on the PET substrate to form the pattern layer arranged two-dimensionally. Each pattern was arranged two-dimensionally, and the angle formed by the arranged first and second directions was 90 degrees.

When the side surfaces of the patterns were observed in the first direction and the second direction, a symmetric structure triangular cross section having the inclination angles of 45 degrees/45 degrees was observed.

The decoration member was prepared by forming a final decoration layer by depositing the inorganic layer made of copper oxide on the pattern layer by using the reactive sputtering.

Evaluation Example 1 (Decoration Member of Example 1)

The position of the detector for the decoration member of Example 1 was (r=200 mm, θ, φ), and with respect to one point A1 on the circumference of the arbitrary circle having a diameter of 80 mm whose center of the decoration layer is the center of the circle, a brightness value L* on CIE L*ab color coordinates was measured by the detector under standard light source conditions of D65 with a wavelength of 380 nm≤λ≤780 nm in the range of 0° to 360° as the angle between the straight line connecting one point A1 on the circumference of the arbitrary circle and the center A0 of the arbitrary circle, and the positive direction of the x-axis of the decoration layer, which was illustrated in FIG. 31.

In addition, the color expression state of the decoration member according to the position of each detector was shown in FIG. 35.

In order to find an interval satisfying Equation A, the $$\left|\frac{dL(\alpha)}{d\alpha}\right| \times \{L(\alpha)\}^{-1}$$

according to each α was calculated and shown in FIG. 32.

As a result of the calculation, a first interval (interval 1) satisfying Equation A was shown in consecutive 16° intervals of 31° to 47°, and $M_1$ calculated through Equation B of interval 1 was 36.9.

A second interval (interval 2) satisfying Equation A was shown in consecutive 21° intervals of 124° to 145°, and $M_2$ calculated through Equation B of interval 2 was 26.3.

A third interval (interval 3) satisfying Equation A was shown in consecutive 20° intervals of 209° to 239°, and $M_3$ calculated through Equation B of interval 3 was 36.6.

A fourth interval (interval 4) satisfying Equation A was shown in consecutive 39° intervals of 294° to 333°, and $M_4$ calculated through Equation B of interval 4 was 44.0.

In addition, it was confirmed that the color expression state of the decoration member when the position of the detector was (r=200 mm, θ=0°, φ=270°) is shown in FIG. 37, and four intervals having constant brightness were shown, and in this case, a contrast parameter calculated by Equation 1 is 0.28.

m1 and m2 satisfying Equations 2 and 2-2 were 109° and 162°, respectively, and m2−m1 was 53°. Further, n1 and n2 satisfying Equations 3 and 3-2 were 286° and 345°, respectively, and n2−n1 was 59°. This calculation process was shown in FIG. 30.

Evaluation Example 2 (Decoration Member of Example 4)

The position of the detector for the decoration member of Example 4 was (r=200 mm, θ=0°, φ=270°), and with respect to one point A1 on the circumference of the arbitrary circle having a diameter of 80 mm whose center of the decoration layer is the center of the circle, a brightness value L* on CIE L*ab color coordinates was measured by the detector under standard light source conditions of D65 with a wavelength of 380 nm≤λ≤780 nm in the range of 0° to 360° as the angle between the straight line connecting one point A1 on the circumference of the arbitrary circle and the center A0 of the arbitrary circle, and the positive direction of the x-axis of the decoration layer, which was illustrated in FIG. 34. In addition, the color expression state of the decoration member according to the position of each detector was shown in FIG. 36.

In order to find an interval satisfying Equation A, the $$\left|\frac{dL(\alpha)}{d\alpha}\right| \times \{L(\alpha)\}^{-1}$$

according to each α was calculated and shown in FIG. 33.

As a result of the calculation, a first interval (interval 1) satisfying Equation A was shown in consecutive 104° intervals of 77° to 181°, and $M_1$ calculated through Equation B of interval 1 was 27.6.

A second interval (interval 2) satisfying Equation A was shown in consecutive 89° intervals of 263° to 352°, and $M_2$ calculated through Equation B of interval 2 was 44.2.

The contrast parameter calculated by Equation 1 was 0.22.

m1 and m2 satisfying Equations 2 and 2-2 were 64° and 197°, respectively, and m2−m1 was 134°. Further, n1 and n2 satisfying Equations 3 and 3-2 were 261° and 360°, respectively, and n2−n1 was 99°. This process was shown in FIG. 34.

The results of Evaluation Examples 1 and 2 were summarized and illustrated in Table 3 below.

TABLE 3

| Classification | Interval 1 $M_1$ | Interval length | Interval 2 $M_2$ | Interval length | Interval 3 $M_3$ | Interval length | Interval 4 $M_4$ | Interval length | Contrast parameter (Equation 1) |
|---|---|---|---|---|---|---|---|---|---|
| Evaluation Exmaple 1 | 36.9 | 16° | 26.3 | 21° | 36.6 | 20° | 44 | 39° | 0.28 |
| Evaluation Exmaple 2 | 27.6 | 104° | 44.2 | 89° | None | | None | | 0.22 |

The contrast parameters were additionally measured by changing the viewing angles θ and φ for Examples 1 and 4, and the contrast parameters $C_n$ at the respective viewing angles θ and φ was measured in the same manner for the remaining films. The measurement was shown in Table 4 below, and the number of consecutive intervals whose length of the horizontal axis satisfying Equation A at each viewing angle (θ, φ) was 10° or more was calculated and shown in Table 5 below.

TABLE 4

| | Film type | | | | | | | | |
|---|---|---|---|---|---|---|---|---|---|
| Coordinate | Contrast parameter ($C_n$) represented by Equation 1 | | | | | | | | |
| θ | 0 | 15 | 15 | 15 | 15 | 15 | 15 | 15 | 15 |
| φ | 270 | 0 | 45 | 90 | 135 | 180 | 225 | 270 | 315 |
| Example 1 | 0.28 | 0.13 | 0.14 | 0.03 | 0.01 | 0.03 | 0.13 | 0.13 | 0.03 |
| Example 2 | 0.36 | 0.22 | 0.21 | 0.03 | 0.01 | 0.03 | 0.21 | 0.22 | 0.11 |
| Example 3 | 0.2 | 0.09 | 0.1 | 0.03 | 0 | 0.02 | 0.1 | 0.09 | 0.04 |
| Example 4 | 0.22 | 0.02 | 0.11 | 0.22 | 0.06 | 0 | 0.06 | 0.22 | 0.11 |
| Example 5 | 0.17 | 0.03 | 0.01 | 0.02 | 0.02 | 0.01 | 0.03 | 0.23 | 0.22 |
| Example 6 | 0.23 | 0.19 | 0.05 | 0.01 | 0.01 | 0.2 | 0.19 | 0 | 0 |
| Comparative Example 1 | 0 | 0 | 0 | 0 | 0 | 0 | 0 | 0 | 0 |
| Comparative Example 2 | 0 | 0 | 0 | 0 | 0 | 0 | 0 | 0 | 0 |
| Comparative Example 3 | 0 | 0 | 0 | 0.02 | 0 | 0 | 0 | 0 | 0.01 |
| Comparative Example 4 | 0 | 0 | 0 | 0 | 0 | 0 | 0 | 0 | 0 |
| Comparative Example 5 | 0.03 | 0.01 | 0 | 0 | 0 | 0.01 | 0 | 0.01 | 0.01 |
| Comparative Example 6 | 0 | 0 | 0 | 0 | 0 | 0 | 0 | 0 | 0 |

TABLE 5

| | Film type | | | | | | | | |
|---|---|---|---|---|---|---|---|---|---|
| Coordinate | Number of consecutive intervals whose length of the horizontal axis satisfying Equation A is 10° or more | | | | | | | | |
| θ | 0 | 15 | 15 | 15 | 15 | 15 | 15 | 15 | 15 |
| φ | 270 | 0 | 45 | 90 | 135 | 180 | 225 | 270 | 315 |
| Example 1 | 4 | 2 | 3 | 2 | 2 | 2 | 3 | 2 | 2 |
| Example 2 | 2 | 2 | 4 | 2 | 2 | 2 | 3 | 2 | 2 |
| Example 3 | 4 | 2 | 3 | 2 | 2 | 2 | 3 | 2 | 2 |
| Example 4 | 2 | 2 | 2 | 2 | 2 | 2 | 2 | 2 | 2 |
| Example 5 | 4 | 2 | 2 | 3 | 3 | 2 | 2 | 3 | 3 |
| Example 6 | 2 | 2 | 2 | 2 | 2 | 3 | 2 | 2 | 2 |
| Comparative Example 1 | 0 | 0 | 0 | 0 | 0 | 0 | 0 | 0 | 0 |
| Comparative Example 2 | 0 | 0 | 0 | 0 | 0 | 0 | 0 | 0 | 0 |
| Comparative Example 3 | 2 | 2 | 2 | 3 | 2 | 2 | 2 | 2 | 3 |
| Comparative Example 4 | 2 | 2 | 2 | 2 | 2 | 2 | 2 | 2 | 2 |
| Comparative Example 5 | 4 | 2 | 2 | 2 | 2 | 2 | 2 | 2 | 2 |
| Comparative Example 6 | 0 | 0 | 0 | 0 | 0 | 0 | 0 | 0 | 0 |

From the above results, the decoration members of Examples had one or more combinations of viewing angles θ and φ in which the parameter represented by Equation 1 was 0.1 or more, but the decoration members of Comparative Examples did not have one or more combinations of viewing angles θ and φ in which the parameter represented by Equation 1 was 0.1 or more. In addition, it was confirmed that the decoration members of Examples had at least two or four or more consecutive intervals whose horizontal axis length satisfying the Equation A was 10° or more. Such a decoration member had adjacent intervals in which the brightness L* was constant as shown in FIGS. 35 and 36, whereby feeling a decoration effect which there was a part where the brightness of the light represented by the decoration member varied greatly depending on the viewing angle.

However, it can be seen that there is no consecutive interval in which the length of the horizontal axis satisfying Equation A is 10° or more or the decoration member of Comparative Example has a contrast parameter $C_n$ of less than 0.1 even if there are the consecutive intervals. Such a decoration member cannot feel the decoration effect as in Examples by very largely changing the brightness L* depending on the viewing angle.

The invention claimed is:

1. A decoration member comprising:
a substrate; and
a decoration layer provided on the substrate,
wherein a brightness value L* on a CIE L*ab color coordinate is measured with respect to one point A1 on a circumference of any circle on the surface of the decoration layer by using a detector positioned at a (r, θ, φ) location of a spatial coordinate system having a center point of the surface of the decoration layer as an original point under a standard light source condition of D65 at a wavelength of 380 nm≤λ≤780 nm,
the spatial coordinate system includes an x axis in any one direction on the surface of the decoration layer, a y axis in another direction on the surface of the decoration layer perpendicular to the x axis, and a z axis in a normal direction to the surface of the decoration layer,
when a graph having an angle α formed between a straight line linking one point A1 on the circumference of the any circle and a center A0 of the any circle and a positive direction of the x axis as a horizontal axis and the measured brightness value L* as a vertical axis is graph G1,
in a range in which α of the graph G1 is 0 to 360°, the number n of consecutive intervals in which a length of the horizontal axis satisfying Equation A below is equal to or larger than 10° is 2 or more, and
there are one or more combinations of θ and φ in which a contrast parameter $C_n$ represented by Equation 1 below is equal to or more than 0.1:

$$C_n = \sum_{i=1}^{n-1} 4 \times \left(\frac{M_i - M_{i+1}}{M_i + M_{i+1}}\right)^2 + 4\delta_n \times \left(\frac{M_n - M_1}{M_n + M_1}\right)^2 \quad \text{[Equation 1]}$$

$$\left|\frac{dL(\alpha)}{d\alpha}\right| \times \{L(\alpha)\}^{-1} \leq 0.001 \quad \text{[Equation A]}$$

$$M_i = \frac{\int_{\alpha_{i1}}^{\alpha_{i2}} L(\alpha) d\alpha}{\alpha_{i2} - \alpha_{i1}} \quad \text{[Equation B]}$$

in Equation 1 above,
the $M_i$ means an average value of $L(\alpha)$ of consecutive i-th intervals $S_i$ in which the length of the horizontal axis satisfying Equation A above is 10° or more which is shown when α of the horizontal axis of the graph G1 increases and is represented by Equation B above,
n represents an integer of 2 or more,
when n is 2, δn is 0,
when n is 3 or more, δn is 1, in Equations A and B, $L(\alpha)$ represents the brightness value L* on the CIE L*ab color coordinate according to the angle α formed between the straight line linking one point A1 on the circumference of the any circle and the center A0 of the any circle and the positive direction of the x axis, $$\left|\frac{dL(\alpha)}{d\alpha}\right|$$

means an absolute value of a slope of the brightness value $L(\alpha)$ for the angle α,
$\alpha_{i2}$ represents a largest α value of the consecutive i-th intervals $S_i$ in which the length of the horizontal axis satisfying Equation A above is 10° or more and the $\alpha_{i1}$ represents a smallest α value of the consecutive i-th intervals $S_i$ in which the length of the horizontal axis satisfying Equation A above is 10° or more,
r of the spatial coordinate system as a distance between the detector and the original point of the spatial coordinate system is 200 mm,
θ of the spatial coordinate system as an angle formed between a straight line passing through the detector and the original point of the spatial coordinate system and the z axis of the positive direction is in the range of 0 to 360°,
φ of the spatial coordinate system as an angle formed between the straight line passing through the detector and the original point of the spatial coordinate system and the x axis of the positive direction is in the range of 0 to 360°, and
a diameter of the any circle is 0.8 times a uniaxial length of the surface of the decoration layer.

2. The decoration member of claim 1, wherein there are one or more combinations of m1 and m2 satisfying Equations 2, 2-1, and 2-2 below:

$$L(m1) = 1.05 \times L_{min} \quad \text{[Equation 2]}$$

$$L(m2) = 1.05 \times L_{min} \quad \text{[Equation 2-1]}$$

$$|m2 - m1| \geq 20° \quad \text{[Equation 2-2]}$$

in Equations 2 to 2-2 above,
m1 and m2 as values corresponding to α of the $L(\alpha)$ are different from each other, and $L_{min}$ represents a minimum value of $L(\alpha)$ of the graph G1 in a range in which α is 0 to 360°.

3. The decoration member of claim 1, wherein there are one or more combinations of n1 and n2 satisfying Equations 3, 3-1, and 3-2 below:

$$L(n1) = 0.975 \times L_{max} \quad \text{[Equation 3]}$$

$$L(n2) = 0.975 \times L_{max} \quad \text{[Equation 3-1]}$$

$$|n2 - n1| \geq 20° \quad \text{[Equation 3-2]}$$

in Equations 3 to 3-2 above,
n1 and n2 as values corresponding to α of the $L(\alpha)$ are different from each other, and
the $L_{max}$ represents a maximum value of $L(\alpha)$ of the graph G1 in the range in which α is 0 to 360°.

4. The decoration member of claim 1, wherein there are one or more $M_i$ satisfying Equations 4 and 5:

$$\frac{|M_i - L_{max}|}{M_i} \geq 0.1 \quad \text{[Equation 4]}$$

$$\frac{|M_i - L_{min}|}{M_i} \geq 0.1 \quad \text{[Equation 5]}$$

in Equations 4 and 5 above, $L_{min}$ represents the minimum value of $L(\alpha)$ of the graph G1 in the range in which $\alpha$ is 0 to 360°, $L_{max}$ represents the maximum value of $L(\alpha)$ of the graph G1 in the range in which $\alpha$ is 0 to 360°, and a definition of $M_i$ is the same as that of claim 1.

5. The decoration member of claim 1, wherein θ of the spatial coordinate system is 0° or more and 15° or less.

6. The decoration member of claim 1, wherein when the surface of the decoration layer is divided by a reference area having a size of 2.5 mm×2.5 mm, the angular luminance of light having a wavelength of 380 nm≤λ≤780 nm emitted from each reference area is the same.

7. The decoration member of claim 1, wherein the substrate includes a convex type structure or a concave type structure arranged in a one dimension.

8. The decoration member of claim 1, wherein the substrate includes a convex type structure or a concave type structure arranged in two dimensions in a first axis direction and a second axis direction forming an angle of more than 0 degree with the first axis clockwise.

9. The decoration member of claim 8, wherein the two-dimensionally arranged convex type structure or concave type structure is arranged in the first axis direction and the second axis direction forming an angle of 30 degrees or more and 150 degrees or less with the first axis clockwise.

10. The decoration member of claim 8, wherein at least one of a cross section Z1 acquired by cutting the convex type structure or concave type structure in a first plane and a cross section Z2 acquired by cutting the convex type structure or concave type structure in a second plane is an asymmetric structure, the first plane is parallel to the first axis direction and the second plane is parallel to the second axis direction, and the first plane and the second plane include a straight line passing through a highest point of the convex type structure or a lowest point of the concave type structure, among normal lines on one surface of the substrate.

11. The decoration member of claim 1, wherein the light absorption layer is constituted by a single layer or multiple layers including one or two types of materials selected from the group consisting of indium (In), titanium (Ti), tin (Sn), Silicon (Si), germanium (Ge), Aluminum (Al), Copper (Cu), Nickel (Ni), Vanadium (V), Tungsten (W), Tantalum (Ta), Molybdenum (Mo), Neodymium (Nb), Iron (Fe), Chromium (Cr), cobalt (Co), gold (Au), and silver (Ag) and one or two types of materials selected from the group consisting of an oxide, nitride, or an oxynitride thereof and carbon and a carbon composite.

12. The decoration member of claim 11, wherein the inorganic layer includes a light absorption layer and a light reflection layer sequentially provided on the substrate, or includes the light reflection layer and the light absorption layer sequentially provided on the substrate.

13. The decoration member of claim 11, further comprising:

a color film provided between the substrate and the inorganic layer, on an opposite surface to a surface of the substrate facing the inorganic layer, or on an opposite surface to a surface of the inorganic layer facing the substrate.

14. The decoration member of claim 12, further comprising:

a color film provided between the substrate and the inorganic layer, between the light absorption layer and the light reflection layer, on the opposite surface to the surface of the substrate facing the inorganic layer, or on the opposite surface to the surface of the inorganic layer facing the substrate.

15. The decoration member of claim 1, wherein dichroism of $\Delta F^*ab > 1$ is provided.

16. The decoration member of claim 1, wherein at least one of an opposite surface to the surface of the substrate facing the decoration layer or an opposite surface to a surface of the decoration layer facing the substrate further includes one or more layers selected from the group consisting of a color expression layer, a scattering layer, a protective layer, an adhesive layer, and a bonding layer.

17. The decoration member of claim 1, wherein the decoration member is a decoration film or a case of a mobile device or an electronic product.

* * * * *